US007896743B2

(12) United States Patent
Parisien

(10) Patent No.: US 7,896,743 B2
(45) Date of Patent: Mar. 1, 2011

(54) METHOD, SYSTEM AND PROGRAM PRODUCT FOR MONITORING AN ONLINE CARD GAME TO PROVIDE A SUMMARY VIEW AND/OR REAL-TIME NOTIFICATIONS

(76) Inventor: Paul Parisien, Clifton Park, NY (US)

( * ) Notice: Subject to any disclaimer, the term of this patent is extended or adjusted under 35 U.S.C. 154(b) by 1416 days.

(21) Appl. No.: 11/315,716

(22) Filed: Dec. 22, 2005

(65) Prior Publication Data

US 2006/0121973 A1 Jun. 8, 2006

(51) Int. Cl.
*G06F 17/00* (2006.01)

(52) U.S. Cl. .......................................... 463/42; 463/43

(58) Field of Classification Search .................... 463/16, 463/25, 40–42
See application file for complete search history.

(56) References Cited

U.S. PATENT DOCUMENTS

| | | | | |
|---|---|---|---|---|
| 2002/0103029 | A1 * | 8/2002 | Finlayson et al. | 463/42 |
| 2003/0069071 | A1 * | 4/2003 | Britt et al. | 463/42 |
| 2003/0070178 | A1 * | 4/2003 | Boyd et al. | 725/110 |
| 2003/0109310 | A1 | 6/2003 | Heaton et al. | |

OTHER PUBLICATIONS

Welcome to Poker Tracker. [online]. PJI, Inc. 2005, 3 pages. [retrieved on Dec. 20, 2005]. Retrieved from the Internet: <URL: http://www.pokertracker.com/>.

What Is PokerOffice?. [online]. 2 pages. [retrieved on Dec. 20, 2005]. Retrieved from the Internet: <URL: http://www.pokeroffice.com/main.html>.

Harler, Josh. Welcome to PokerAce Software!. [online]. 2005, 1 page. [retrieved on Dec. 20, 2005]. Retrieved from the Internet: <URL: http://www.pokeracesoftware.com/>.

Poker Sherlock Your Poker Room Detective!. [online]. BuzzWorkz, Inc. 2005, 2 pages. [retrieved on Dec. 20, 2005]. Retrieved from the Internet: <URL: http://www.pokersherlock.com/>.

* cited by examiner

*Primary Examiner* — John M Hotaling
*Assistant Examiner* — Eric M Thomas
(74) *Attorney, Agent, or Firm* — Schmeiser, Olsen & Watts, LLP

(57) ABSTRACT

A method, system and program product for monitoring an online card game, such as poker. A table view is displayed at a client that summarizes recently played hands, raises, and table conditions, and also includes scaled player classifications (tight or loose; passive or aggressive), counts of notifications of plays of interest, win/loss history, and links to player statistics and player performance graphs. Scaled player classifications are automatically configured. Notification details are displayed via links on the table view. Summaries of known hands based on predefined conditions are displayed. Summary displays of pre-flop hands and hands on flop, turn or river are also provided.

3 Claims, 21 Drawing Sheets

300

300

600

700

Hands Played by Situation

Full Table | Short Handed | Heads Up

| Category | Button | SB | BB | Pos3 | Pos4 | Pos5 | Pos6 | Pos7 | Pos8 | Pos9 |
|---|---|---|---|---|---|---|---|---|---|---|
| Hand out of position | Q3 | | | | A3 | | | | | |
| Raised hands | | | | | | | | | | |
| Hands Not raised | | | | | | | | | | |
| Check Raises | | | | | | | | | | |
| Cold call preflop | | | | | KQs | | | | | |
| Steal Attempts | | | | | | | | | | |
| Defended Blinds | | | | | 66 | | | | | |
| Bluffs on the River | | | | | | | | | | |
| Second best hand river call | | | | | | | | | | |
| Called without pot odds | | | 87s | | | | | | | |
| Dominated hand | | | | | | | AT | | | |
| Free Card Raise | | | | | | | | | | |

800

820

821 Name1 posts small blind
822 Name2 posts big blind
823 Name3 calls
824 Name4 Folds
825 Name5 Raises
826 Name6 Folds
827 Name7 Reraises
828 Name8 Folds
829 Name9 Folds
830 Name10 Folds
831 Name1 Folds
832 Name2 Folds
833 Name3 Reraises
834 Name5 Calls
835 Name6 Calls

*FIG. 8B*

850

1. Player calls 1 bet in a particular position when first in
2. Player calls 1 bet in a particular position with 1 caller already in hand
3. Player calls 1 bet in a particular position with 2 or more callers already in hand (call multihanded)
4. Player calls 2 or more bets in a particular position
5. Player raises in a particular position when first in
6. Player raises in a particular position with 1 caller already in hand
7. Player raises in a particular position with 2 or more callers already in hand
8. Player re-raises in a particular position after the raiser (re-raise first in)
9. Player re-raises in a particular position when there is 1 or more callers after the raiser
10. Player caps the betting in a particular position when 1 player has yet to fold
11. Player caps the betting in a particular position when 2 or more player have yet to fold
12. Player call-raises from a particular position
13. Player attempts a steal from the button or the cut-off
14. Player defends small blind
15. Player defends big blind

*FIG. 8C*

910

| |
|---|
| Player checks |
| Player bets |
| Player calls 1 bet |
| Player calls 2 bets (a super action of calling 1 bet) |
| Player calls 3 or more bets (a super action of calling 2 bets) |
| Player raises first in after the better |
| Player raises with one or more callers after the better |
| Player re-raises |
| Player Check-Raises |

*FIG. 9B*

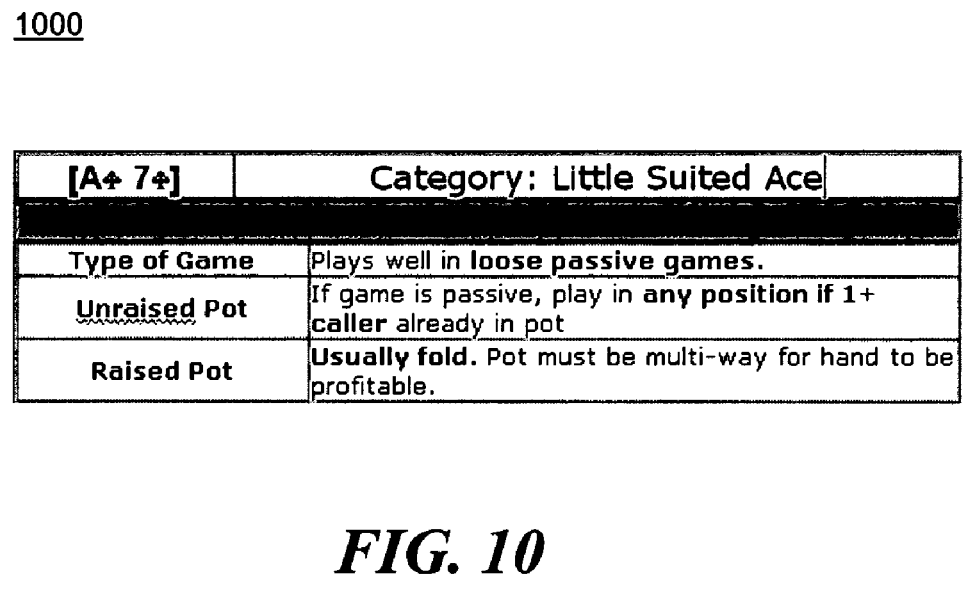

1000

| [A♣ 7♣] | Category: Little Suited Ace |
|---|---|
| [illegible] | |
| Type of Game | Plays well in **loose passive games.** |
| Unraised Pot | If game is passive, play in **any position if 1+ caller** already in pot |
| Raised Pot | **Usually fold.** Pot must be multi-way for hand to be profitable. |

*FIG. 10*

1200

| | Community Cards | Name1 | Name2 | Name3 | Name4 | Name5 | Name6 | Name7 | Name8 | Name9 | Name10 |
|---|---|---|---|---|---|---|---|---|---|---|---|
| Dealer | | | | | | | | | | | |
| Dealt | | | C1,C2 | | | | | | | | |
| Pre-flop | Empty | Action List | Action List | Action List | Action List | Action List | Action List | Action List | Action List | Action List | Action List |
| Flop | C1,C2,C3 | Action List | Action List | Action List | Action List | Action List | Action List | Action List | Action List | Action List | Action List |
| Turn | C4 | Action List | Action List | Action List | Action List | Action List | Action List | Action List | Action List | Action List | Action List |
| River | C5 | Action List | Action List | Action List | Action List | Action List | Action List | Action List | Action List | Action List | Action List |
| Win/Loss | | | | | | | | | | | |

*FIG. 12A*

1250

| | Community Cards | Name1 | Name2 | Name3 | Name4 | Name5 | Name6 | Name7 | Name8 | Name9 | Name10 |
|---|---|---|---|---|---|---|---|---|---|---|---|
| Dealer | | No | No | No | No | No | No | No | No | No | Yes |
| Dealt | | | | Ad,As | | | | | | | |
| Pre-flop | Empty | SB 100 | BB 200 | Call 200 ReRaise 1000 | Fold | Raise 400 Call 800 | Fold | ReRaise 800 Call 400 | Fold | Fold | Fold |
| Flop | Ac, Ah, 2s | | | Bet 200 Returned 200 | | Fold | | Fold | | | |
| Turn | | | | | | | | | | | |
| River | | | | | | | | | | | |
| Showdown | | | | | | | | | | | |
| Win/Loss | | -100 | -200 | +2700 | | -1200 | | -1200 | | | |

*FIG. 12B*

METHOD, SYSTEM AND PROGRAM PRODUCT FOR MONITORING AN ONLINE CARD GAME TO PROVIDE A SUMMARY VIEW AND/OR REAL-TIME NOTIFICATIONS

BACKGROUND OF THE INVENTION

1. Technical Field

The present invention relates to monitoring an online card game, and more particularly to a technique for monitoring an online poker room to provide a summary view and/or real-time notifications of plays of interest.

2. Related Art

Conventional online poker tracking software provides player behavior statistics based on averaging all the hands on record for a player, or for the current session. These statistics are limited in that they do not provide summaries of recently played hands within a session, and precise histories of single hands included in those recently played hands. Further, known poker tracking software requires an extra, non-automated, configuration step in which the burden is on the user to specify values that determine classifications of player behavior. Still further, conventional notifications to a user of specific play information relative to an opponent is limited in that the information is based on a percentage of time that the opponent makes that specific play. Because of the limitations and deficiencies described above, there exists a need for an improved technique for monitoring an online card game.

SUMMARY OF THE INVENTION

In first embodiments, the present invention provides a method of monitoring an online card game provided by a server computing system in a networked computing environment, comprising:

displaying, at a client computing system in communication with said server computing system via a network, a table view associated with a session of said online card game, said table view including a plurality of lines, each line of said plurality of lines being a row or a column of said table view, said table view comprising at least one of:

a first area comprising a table having a first plurality of cells, each cell identified by a row and a column of said table, wherein a cell of said first plurality of cells is associated with a player of a plurality of players of said card game and with a hand of a plurality of hands of said session, wherein said cell of said first plurality of cells displays at least one of:

- a starting hand associated with said player, said starting hand being shown by said player during said hand,
- a first indicator of said first area indicating that said player raised or re-raised pre-flop during said hand,
- a second indicator of said first area indicating that said player saw the flop during said hand,
- a third indicator of said first area indicating that said player is associated with the dealer button during said hand,
- a fourth indicator of said first area indicating that said player won said hand, and
- a fifth indicator of said first area indicating that said player was not dealt cards for said hand;

a second area comprising a second plurality of cells in a first set of one or more lines of said plurality of lines, wherein a cell of said second plurality of cells is associated with said hand, wherein said cell of said second plurality of cells displays at least one of:

- a first indicator of said second area indicating that said hand was raised pre-flop or not raised pre-flop,
- a second indicator of said second area indicating that said hand was raised on the flop or not raised on the flop,
- a third indicator of said second area indicating that said hand was raised on the turn or not raised on the turn,
- a fourth indicator of said second area indicating that said hand was raised on the river or not raised on the river, and
- a fifth indicator of said second area indicating that said hand was raised on any of the streets;

a third area comprising a third plurality of cells in a second set of one or more lines of said plurality of lines, wherein a cell of said third plurality of cells is associated with said hand, and displays at least one of:

a first number of players participating in said hand, a size of the pot associated with said hand, a second number of players who saw the flop during said hand, a third number of players who saw the turn during said hand, a fourth number of players who saw the river during said hand, and a fifth number of players participating in the showdown during said hand;

a fourth area comprising a fourth plurality of cells in a first line of said plurality of lines, wherein a cell of said fourth plurality of cells displays an indicator of said fourth area indicating a count of one or more plays of said online card game, said one or more plays being of interest to a user of said client computing system, said indicator of said fourth area associated with a first player of a plurality of players of said online card game, wherein a play of said one or more plays meets one or more predefined conditions, and wherein said indicator of said fourth area is associated with a first link selectable by said user;

a fifth area comprising a fifth plurality of cells in a second line of said plurality of lines, wherein a cell of said fifth plurality of cells displays an identifier of said player, said identifier of said player associated with a selectable second link, wherein selecting said second link displays a report that includes known starting hands played by said player over one or more sessions in a configurable period of time;

a sixth area comprising a sixth plurality of cells in a third line of said plurality of lines, wherein a cell of said sixth plurality of cells displays a selectable third link, said cell associated with said player, wherein said cell includes a first indicator of said sixth area indicating that said player is a long term winner or a long term loser based on known hands, wherein selecting said third link displays a graph that includes a historical performance of said player; and a seventh area comprising a seventh plurality of cells in a first set of lines of said plurality of lines, wherein a first cell, second cell and third cell of said seventh plurality of cells are in a first line, second line and third line, respectively, of said first set of lines, wherein said first cell of said seventh plurality of cells displays a number of hands associated with said player, wherein said second cell of said seventh plurality of cells displays a first indicator of said seventh area indicating a first amount of money said user won from or lost to said player, and wherein said third cell of said seventh plurality of cells displays a second indicator of said seventh area indicating a second amount of money said player has won or lost during said session.

In second embodiments, the present invention provides a method of monitoring an online card game provided by a server computing system in a networked computing environment, comprising:

displaying one or more indicators at a client computing system in communication with said server computing system via a network, wherein an indicator of said one or more indicators indicates a count of one or more plays of said online card game, said one or more plays being of interest to a user of said client computing system, said indicator associated with a first player of a plurality of players of said online card game, and said user being a second player of said plurality of players;

wherein a play of said one or more plays meets one or more predefined conditions, and wherein said indicator is associated with a link selectable by said user; and displaying, in response to said user selecting said link, details of one or more hands played by said first player, wherein one or more plays of said one or more hands satisfy said one or more predefined conditions.

In third embodiments, the present invention provides a method of monitoring an online card game provided by a server computing system in a networked computing environment, comprising:

detecting a starting hand of a user during a session of said online card game, said user utilizing a client computing system in communication with said server computing system via a network to play said online card game; and displaying, at said client computing system, teaching aid information, said teaching aid information including at least one of:

a category of said starting hand, a type of game in which playing said starting hand is advised based on predefined criteria, a type of game in which playing said starting hand is not advised based on said predefined criteria, a first set of instructions including how to play said starting hand in an unraised pot, and a second set of instructions including how to play said starting hand in a raised pot.

In fourth embodiments, the present invention provides a method of monitoring an online card game provided by a server computing system in a networked computing environment, comprising:

displaying, at a client computing system in communication with said server computing system via a network, said client computing system being utilized by a user playing an online card game, at least one of:

a first table, wherein a first cell of said first table includes a first set of one or more starting hands played by a player meeting a predefined condition of a plurality of predefined conditions, wherein a starting hand of said one or more starting hands is associated with a position of said player during a hand of said online card game and said predefined condition, a second table, wherein a second cell of said second table includes a second set of one or more starting hands played by said player in a pre-flop situation of a plurality of predefined pre-flop situations, and a third table, wherein a third cell of said third table includes a set of one or more values of a set of one or more hands previously played by said player in a situation that matches a current situation of said player, and associated with a board texture that matches a current board texture associated with said player.

In fifth embodiments, the present invention provides a method of monitoring an online card game provided by a server computing system in a networked computing environment, comprising:

displaying, at a client computing system in communication with said server computing system via a network, a table view associated with a session of said online card game, said table view including a plurality of rows and a plurality of columns said table view comprising:

a first area comprising a table having a first plurality of cells, each cell identified by a row and a column of said table, wherein a cell of said first plurality of cells is associated with a player of a plurality of players of said card game and is associated with a hand of a plurality of hands of said session, wherein said cell of said first plurality of cells displays at least one of:

a starting hand associated with said player, said starting hand being shown by said player during said hand, a first indicator of said first area indicating that said player raised or re-raised pre-flop during said hand, a second indicator of said first area indicating that said player saw the flop during said hand, a third indicator of said first area indicating that said player is associated with the dealer button during said hand, a fourth indicator of said first area indicating that said player won said hand, and a fifth indicator of said first area indicating that said player was not dealt cards for said hand;

a second area comprising a second plurality of cells in a first row of said plurality of rows, wherein a cell of said second plurality of cells is associated with said hand, wherein said cell of said second plurality of cells displays a first indicator of said second area indicating that said hand was raised pre-flop or not raised pre-flop;

a third area comprising a third plurality of cells in four rows of said plurality of rows, wherein a first cell of a first row of said four rows displays a size of the pot associated with said hand, wherein a second cell of a second row of said four rows displays a first number of players participating in said hand, wherein a third cell of a third row of said four rows displays a second number of players who saw the flop during said hand, and wherein a fourth cell of a fourth row of said four rows displays a third number of ending players, said ending players participating in the showdown during said hand;

a fourth area comprising a fourth plurality of cells, wherein a first cell and a second cell of said fourth plurality of cells are in a fourth column and a fifth column, respectively, of said plurality of columns, wherein said first cell of said fourth plurality of cells displays a first indicator of said fourth area that classifies said player as loose or tight, and wherein said second cell of said fourth plurality of cells displays a second indicator of said fourth area that classifies said player as passive or aggressive;

a fifth area comprising a fifth plurality of cells in a third column of said plurality of columns, wherein a cell of said fifth plurality of cells displays an identifier of said player; and a sixth area comprising a sixth plurality of cells in a first column and a second column of said plurality of columns, wherein a first cell of said sixth plurality of cells is included in said first column and a second cell of said sixth plurality of cells is included in said second column, wherein said first cell of said sixth plurality of cells displays a number of hands associated with said player, and wherein said second cell of said sixth plurality of cells displays an indicator of said sixth area indicating an amount of money said player has won or lost during said session.

In other embodiments, the present invention provides systems and program products for the features and capabilities described above.

Advantageously, the present invention provides a technique for monitoring an online card game to provide a summary table view and real-time notifications to users.

BRIEF DESCRIPTION OF THE DRAWINGS

FIG. 8B is a list of plays resulting in the table of FIG. 8A, in accordance with embodiments of the present invention.

FIG. 8C is a list of predefined pre-flop situations utilized by the table of FIG. 8A, in accordance with embodiments of the present invention.

FIG. 9B is a list of actions that can be included in the table of FIG. 9B, in accordance with embodiments of the present invention.

FIG. 10 is an image of the pre-flop teaching aid displayed in the process of FIG. 2, in accordance with embodiments of the present invention.

FIG. 12A is a canonical structure of a hand of a card game monitored by the process of FIG. 2, in accordance with embodiments of the present invention.

FIG. 12B is the canonical structure of FIG. 12A that includes entries from a sample hand, in accordance with embodiments of the present invention.

DETAILED DESCRIPTION OF THE INVENTION

Overview

Figure 1:
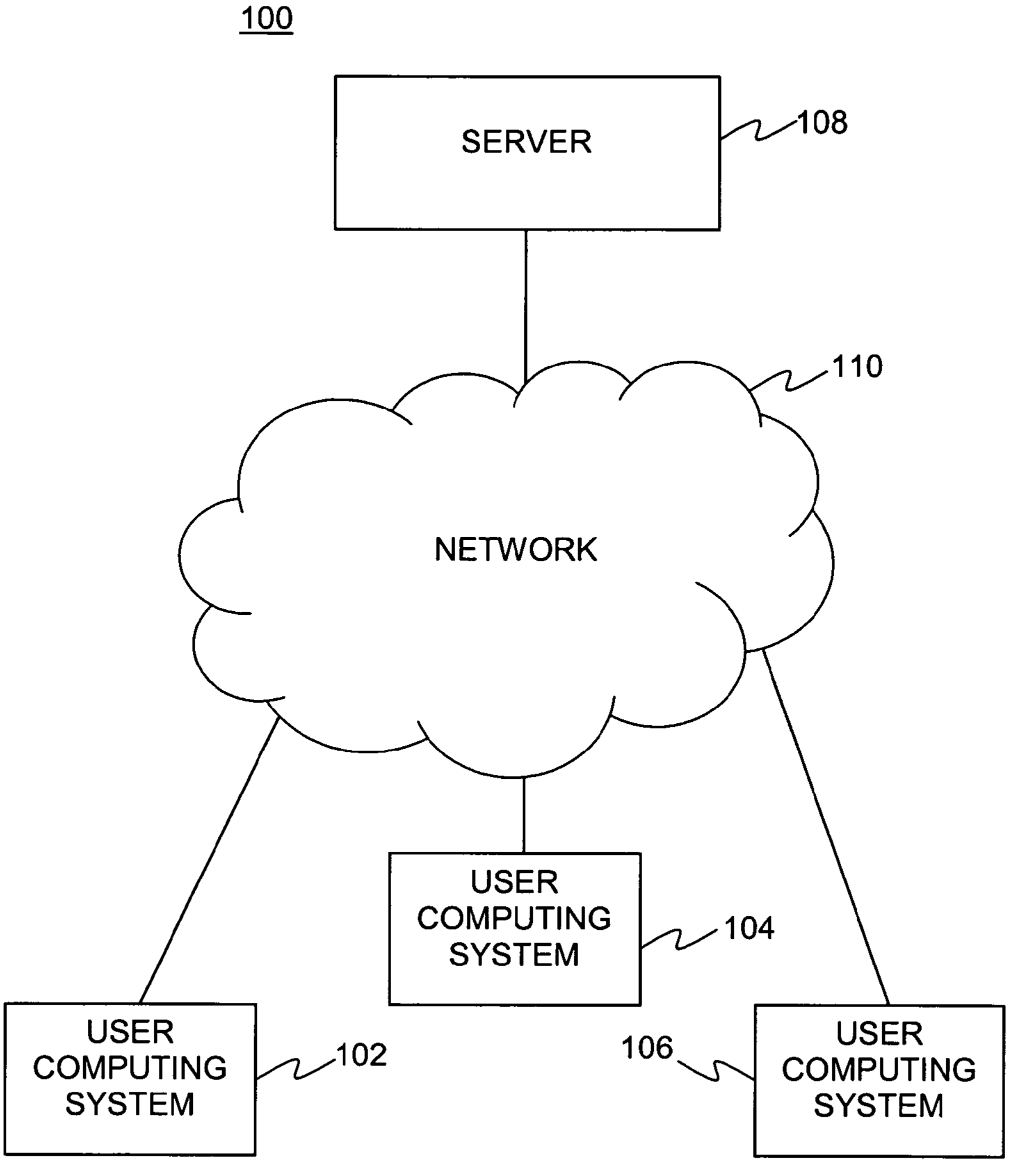
FIG. 1 is a block diagram of a system for monitoring an online card game, in accordance with embodiments of the present invention.

FIG. 1 is a block diagram of a system for monitoring an online card game, in accordance with embodiments of the present invention. System 100 includes multiple user computing systems including computing systems 102, 104, and 106. User computing systems 102, 104, 106 include client software (not shown) in communication with remote software managing an online card game website residing at a server computing system 108. The communication between the client software and the online card game software of server 108 is performed via a network (e.g., the Internet) 110. The online card game website provides a card game playable by multiple human players, each player utilizing the client software on one of the multiple user computing systems to play the card game. The online card game offered by server 108 is, for example, a poker game such as Texas Hold 'em poker. User computing system 102, 104, 106 also include code (not shown) that implements an online card game monitoring system (hereinafter referred to simply as the "monitoring system").

Hereinafter, Texas Hold 'em examples are used in the description of the present invention, but a person skilled in the art will understand that certain features and capabilities described herein can be applied to any communal card online poker game (e.g., Omaha poker), to both communal and non-communal card online poker games, or to both poker and non-poker online card games.

Figure 2:
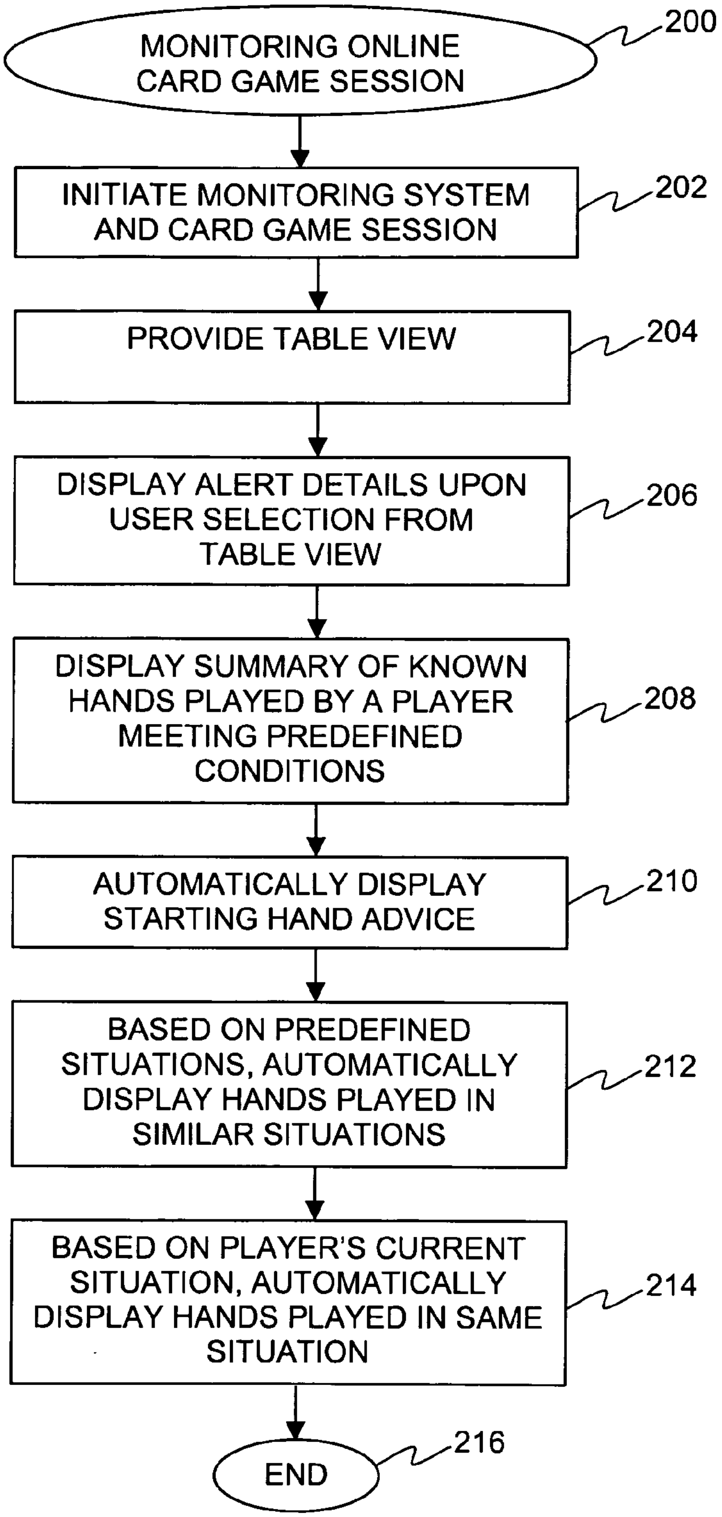
FIG. 2 is a flow chart of a process that monitors an online card game session for the system of FIG. 1, in accordance with embodiments of the present invention.

FIG. 2 is a flow chart of a process that monitors an online card game session for the system of FIG. 1, in accordance with embodiments of the present invention. The online card game monitoring process is implemented by the monitoring system and begins at step 200. In step 202, client software for monitoring one or more online card games, and software for playing the online card game offered by server 108 (see FIG. 1) are initiated at user computing system 102 (see FIG. 1). In step 204, a table view is automatically provided that displays to the user dynamically updated information relative to the action at the user's Texas Hold 'em table. In one embodiment, the table view includes one or more alert indicators associated with a player. In one embodiment, the alert indicators include a count of plays of interest that meet predefined conditions. The alert indicators can be selected to display alert details. The table view is described in more detail below relative to FIG. 3.

In step 206, the user selects an alert indicator for a player, and alert details are displayed in, for example, an alert window. Alert details are described in more detail below relative to FIG. 6. In step 208, a summary of known hands played by a player meeting predefined conditions is displayed. The summary of known hands is described below relative to FIG. 7.

Step 210 provides a pre-flop teaching aid to the user as starting hand advice is automatically displayed. This teaching aid is described below relative to FIG. 10. In step 212, the monitoring process automatically displays, based on pre-defined situations, hands played in similar situations. In step 214, the monitoring process automatically displays, based on a player's current situation, hands played in the same situation. The displays of steps 212 and 214 are described below relative to FIGS. 8A and 9A, respectively. The monitoring of the online card game ends at step 216.

Embodiments of the present invention include the process of FIG. 2, with the steps 204-214 being in any order, as well as step 202 together with any subset of the steps 204-214, with each subset being in any order. Other embodiments include the above-described embodiments enhanced by other features and capabilities described herein.

Table View

Figure 3:
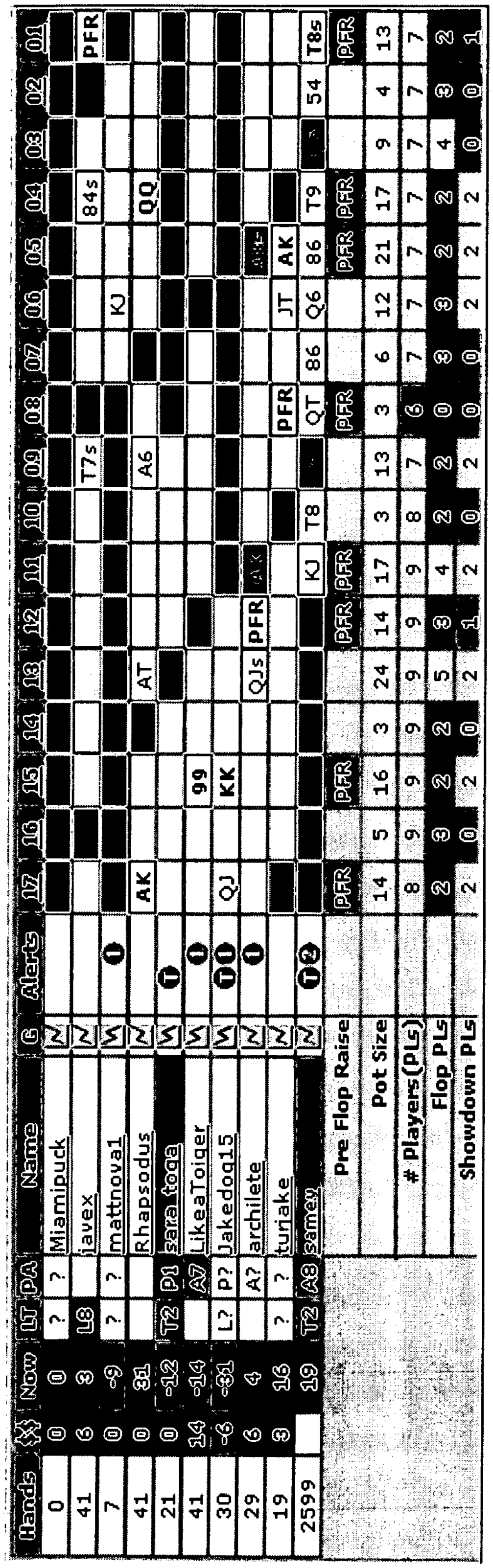
FIG. 3 is an image of a table view provided by the process of FIG. 2, in accordance with embodiments of the present invention.

FIG. 3 is an image of a table view provided by the process of FIG. 2, in accordance with embodiments of the present invention. Table view 300 provides the user with real-time information relative to the action in the user's online poker session. The rows and columns of table view 300 are described in Table 1.

TABLE 1

| Row or Column | Description |
|---|---|
| Hands | Number of hands for which data has been collected for a player. |
| $$ | Money user has won or lost against an opponent. |
| Now | Money won or lost in the current poker session. |
| LT | Indicates a Loose (L) or Tight (T) player. |
| PA | Indicates a Passive (P) or Aggressive (A) player. |
| Name | The name of the player. |
| G | Selectable icon to display a player graph. |
| Alerts | Number of Alerts on the player. |
| Pre Flop Raise | Indicates if a hand was raised pre-flop. |
| Pot Size | Size of the pot at the end of the hand. |
| # Players (PLs) | Number of players dealt in the hand. |
| Flop PLs | Number of players that saw the flop. |
| Showdown PLs | Number of players that saw the showdown. |
| Numbered Columns (17-01) | Most recently played hands. |

The row and column names provided in Table 1 are examples only, and the present invention contemplates other names of any or all of the rows and columns, where the other names indicate the descriptions in Table 1. In another embodiment, the $$ column is renamed up/down, the PA column is renamed AP, the # Players (PLs) row is renamed # of Players, the Flop PLs row is renamed # Players at flop, the Showdown PLs row is renamed # Ending Players, and the numbered columns 01 through 09 are renamed 1 through 9. Further, the present invention is not limited to the 17 numbered columns of FIG. 3, nor to the order of those columns. For example, other numbers of columns, such as 15 or 20 columns can be shown in table view 300, and/or the order of the columns may be changed so that the column numbers are increasing from left to right. In one embodiment, 20 columns are included in table view 300, and the order of the columns is increasing in column number from left to right. Still further, the display of numbered columns can include a pre-defined number of columns displayable in one window, along with a mechanism for scrolling the display of columns to allow viewing of additional numbered columns in various series of columns that include the pre-defined number of columns. For example, numbered columns 20 to 04 can be shown in table view 300 along with a scroll bar that allows the user to scroll the display to show various series of 17 columns, such as columns 19 to 03, 18 to 02, and 17 to 01.

The columns and rows of table view 300 are described in more detail below:

Hands: Number of hands for which data has been collected for a player. The player analysis described below are based on data collected for the number of hands indicated in this column.

$$: The monitoring system tracks how much money the user has won or lost against each opponent. This column allows the user to quickly determine whether an opponent is one who the user has dominated in the past or whether the opponent has dominated the user in the past.

Now: The monitoring system tracks the money winnings (and losses) of each player during the current session. This column can be used in conjunction with the LT and PA columns to facilitate determining if a player is changing his or her style of play based on current performance. For example, a player who is losing a significant amount of money could be (or go) on tilt, while other players will simply tighten up their style of play.

LT: Indicates a Loose (L) or Tight (T) player. As the monitoring system collects data on each opponent, it classifies the opponents as either Loose or Tight. In one embodiment, optimal classifications of Loose or Tight are determined with data for an opponent from at least a pre-determined number of hands (e.g., 40 hands). The number of hands is user-configurable. This indicator facilitates adjusting the user's play against the opponent. Loose players play many hands out of position and then continue to play them too far. In contrast, Tight players rarely play hands out of position and can be quick to fold. The LT column can include the indicators shown in Table 2.

TABLE 2

| Loose-Tight indicator | Description |
|---|---|
| ? | The data is insufficient to classify the player as either Loose or Tight. |
| T? | The current data indicates that the player is Tight. However, there is insufficient data to confirm the classification. |
| T0 | The player is very Tight. The player's ranking is within the top 10% of low limit players in terms of being tight. |
| T1 | The player is Tight. The player's ranking is within the top 20% of low limit players in terms of being tight. |
| T2 | The player is somewhat tight. The player's ranking is within the top 30% of low limit players in terms of being tight. |
| Field is blank | The player is neither Loose nor Tight. |
| L7 | The player is somewhat loose. The player's ranking is within the top 30% of low limit players in terms of being loose. |
| L8 | The player is loose. The player's ranking is within the top 20% of low limit players in terms of being loose. |
| L9 | This player is very loose. The player's ranking is within the top 10% of low limit players in terms of being loose. |
| L? | The current data indicates that this player is Loose. However, there is insufficient data to confirm the classification. |

PA: Indicates a Passive (P) or Aggressive (A) player. As the monitoring system collects data on each opponent, it classifies the opponents as either Passive or Aggressive. In one embodiment, optimal classifications of Passive or Aggressive are determined with data for an opponent from at least a pre-determined number of hands (e.g., 40 hands). The number of hands is user-configurable. This indicator facilitates adjusting the user's play against the opponent. Passive players rarely check-raise, raise or re-raise. In contrast, Aggressive players are capable of check raising, raising or re-raising at almost any time. The PA column can include the indicators in Table 3.

TABLE 3

| Passive-Aggressive indicator | Description |
|---|---|
| ? | The data is insufficient to classify the player as either Passive or Aggressive. |
| P? | The current data indicates that the player is Passive. However, there is insufficient data to confirm the classification. |
| P0 | The player is very Passive. The player's ranking is within the top 10% of low limit players in terms of being passive. If the player raises pre-flop, the user can expect that the player has AA, KK, QQ or AK. |
| P1 | The player is Passive. The player's ranking is within the top 20% of low limit players in terms of being passive. Expect this player to have a very good hand if he or she shows strength. Pre-flop raises, especially out of position, indicates that the player has a premium hand. |
| P2 | The player is somewhat Passive. The player's ranking is within the top 30% of low limit players in terms of being passive. |
| Field is blank | The player is neither Passive nor Aggressive. |
| A7 | The player is somewhat Aggressive. The player's ranking is within the top 30% of low limit players in terms of being aggressive. |
| A8 | The player is Aggressive. The player's ranking is within the top 20% of low limit players in terms of being aggressive. |
| A9 | This player is very Aggressive. The player's ranking is within the top 10% of low limit players in terms of being aggressive. |
| A? | The current data indicates that this player is Aggressive. However, there is insufficient data to confirm the classification. |

The percentages in Tables 2 and 3 are examples. The present invention contemplates other embodiments that include other percentages in ascending order that are used as the bases for the T0, T1, and T2 and/or the P0, P1 and P2 indicators. Similarly, other embodiments include other percentages in descending order that are used as the bases of the L7, L8, and L9 and/or the A7, A8 and A9 indicators. Further, the particular indicators of L7, L8, L9, A7, A8, A9, T0, T1, T2, P0, P1, and P2 are merely examples. Other embodiments are contemplated that use any suitable alternative indicators.

Name: Each name of a player is a selectable link to a hand report for that player. The names in the Name field are highlighted to facilitate identifying the players a user wants to play against, or players a user wants to avoid playing against. A name highlighted in a first color (e.g., green) indicates a player who is "Tight and Passive" or "Loose and Passive". "Tight and Passive" players are typically unimaginative, which facilitates a user's choice of strategy to use against them. "Loose and Passive" players play too many hands and when they show strength, they usually have a very good hand. These are desirable players to play against.

A name highlighted in a second color (e.g., red) indicates a player who is "Tight and Aggressive" or "Loose and Aggressive". "Tight and Aggressive" is the mark of a good player. This type of player will start with the best hands and use aggression to her or his advantage. "Loose and Aggressive" players play too many hands and are very aggressive. Although these players are typically long-term losers, they often go on wild winning and losing streaks. They are difficult to play against because the user will rarely know where she or he stands in the hand. If the user plays against them on their winning night where the cards are running their way, it could significantly diminish the user's profits. Sometimes it is best for the user to avoid these players altogether.

G (Graph Icon): Selectable graph icons to view a graph of how the player has been performing. One type of graph icon having a graph line that is generally increasing and/or displayed in a first color (e.g., green) indicates a player with a positive record over all sessions tracked by the monitoring system. Another type of graph icon having a graph line that is generally decreasing and/or displayed in a second color (e.g., red) indicates a player with a negative record over all sessions tracked by the monitoring system. The user selects a graph icon to display a detailed performance trend for the player associated with the icon. The trend may have typical graph operations such as auto-scaling, manual scaling, etc.

Alerts: Indicators that display the number of notifications (a.k.a. alerts) that the monitoring system has generated, and which are associated with a player. The alert indicators are associated with one or more types of notifications related to, for example, hand frequency analysis, basic hand selections, beginner mistakes, and advanced plays. The alert indicator is selectable by the user to display a window that includes the details of one or more of the alerts associated with the player. In one embodiment, selecting any alert indicator associated with a player displays a window that includes details of all of the alerts associated with that player. In an alternate embodiment, details of one or more types of alerts are displayed automatically, without requiring the user to select the alert indicator on table view 300.

Pre Flop Raise: An indicator (e.g., PFR) in this row indicates which hand(s) corresponding to the numbered columns were raised pre-flop. In one embodiment, the PFR indicator is displayed in a field having a colored background (e.g., a red background). This indicator allows the user to quickly see if the table condition is Aggressive or Passive, and to adjust the user's starting hand requirements accordingly. This indicator is also useful when the user is playing multiple tables simultaneously, because it is easy to misjudge how a table is playing when the user's attention is divided between two or more tables. A variation of this indicator is also contemplated by the present invention. The variation includes four sections, one for each street, and each section is color coded with the most aggressive action on that street. For example, green indicates check, yellow indicates bet, orange indicates raise and red indicates re-raise.

occurred during a hand without needing to review hard-to-read log files. The text, boldface and color indicators under each numbered column are summarized in Table 4.

TABLE 4

| Numbered column information | Description |
|---|---|
| Text (e.g., QJ, 84s) | If a player showed her or his cards, the monitoring system displays them in this field. A lower case "s" denotes suited cards. Ace King, Queen, Jack and Ten are indicated with A, K, Q, J and T, respectively. |
| Text with an indicator (e.g., boldface text) | If the cards are shown with the indicator (e.g., boldface), this indicates that the player raised or re-raised pre-flop. For example, AQs in bold indicates that Ace-Queen suited were the hole cards for a player that raised pre-flop. The letters PFR in bold indicate that the player raised pre-flop, but that the monitoring system was unable to determine what the starting cards were. |
| First color (e.g., light blue) highlight | Player saw the flop |
| Second color (e.g., dark blue) highlight | Player was on the dealer button |
| Third color (e.g., red) border | Player won the hand |
| Fourth color (e.g., gray) highlight | Player was not dealt cards for that hand. |

Pot Size: This row includes the size of the pot at the end of each of the hands indicated by the numbered columns. This indicator allows the user to quickly review the size of the winning pot over the most recent hands.

Players (PLs): This row includes the number of players who were dealt cards in each of the hands indicated by the numbered columns. In one embodiment, a field in this row is highlighted in one color (e.g., red) when 6 or fewer players are at the table to indicate that the game is short-handed.

Flop PLs: This row includes the number of players who saw the flop in each of the hands indicated by the numbered columns. This indicator allows the user to quickly determine if the table is loose or tight. Fields with various highlight colors indicate different table conditions. A first highlight color (e.g., orange) indicates that the table is tight pre-flop. A second highlight color (e.g., white) indicates the table is average pre-flop. A third highlight color (e.g., purple) indicates the table is loose pre-flop. If a user sees a significant number of highlights of the first color, the user is at a tight table (i.e., few players in each hand). If a user sees a significant number of highlights of the third color, the user is at a loose table.

Showdown PLs: This row includes the number of players that saw the showdown in the each of the hands indicated by the numbered columns. This indicator allows the user to quickly review how far, on average, the players are playing their hands. Fields with various highlight colors indicate different table conditions. A first highlight color (e.g., orange) indicates that the table is tight post-flop. A second highlight color (e.g., white) indicates the table is average post-flop. A third highlight color (e.g., purple) indicates the table is loose post-flop. A fourth highlight color indicates the showdown was uncontested (i.e., the player bet and every other player folded). If a user sees a significant number of highlights of the first color, the user is at a tight table (i.e., few players in each hand). If a user sees a significant number of highlights of the third color, the user is at a loose table.

Numbered Columns (17-01): These columns summarize the most recently played hands. In one embodiment, the columns are ordered from the most recent hand to the least recent hand. In an alternate embodiment, the columns are ordered from the least recent hand to the most recent hand. The user can review the hands in detail by selecting the hand number in the column header. These columns and the selection of the hand details allow the user to quickly review the action that In one embodiment, the numbered columns are in a first area of table view 300, the pre-flop raise line is a second area, the summary of table conditions lines (e.g., pot size, # Players (PLs), etc.) are in a third area, the player classifications are in a fourth area, the alert counts are in a fifth area, the player names are in a sixth area, the graph icons are in a seventh area, and the win/loss history is a ninth area. In other embodiments, table 300 includes only a subset of the rows and/or columns listed above. In still other embodiments, additional rows and/or columns are added to table view 300. For example, the numbered columns can include an indicator displaying a player's hole cards when mucked. As another example, summary lines can be added to table view 300 to list the number of players who saw the Turn, and/or the number of players who saw the River.

Player Rankings

Figure 4:
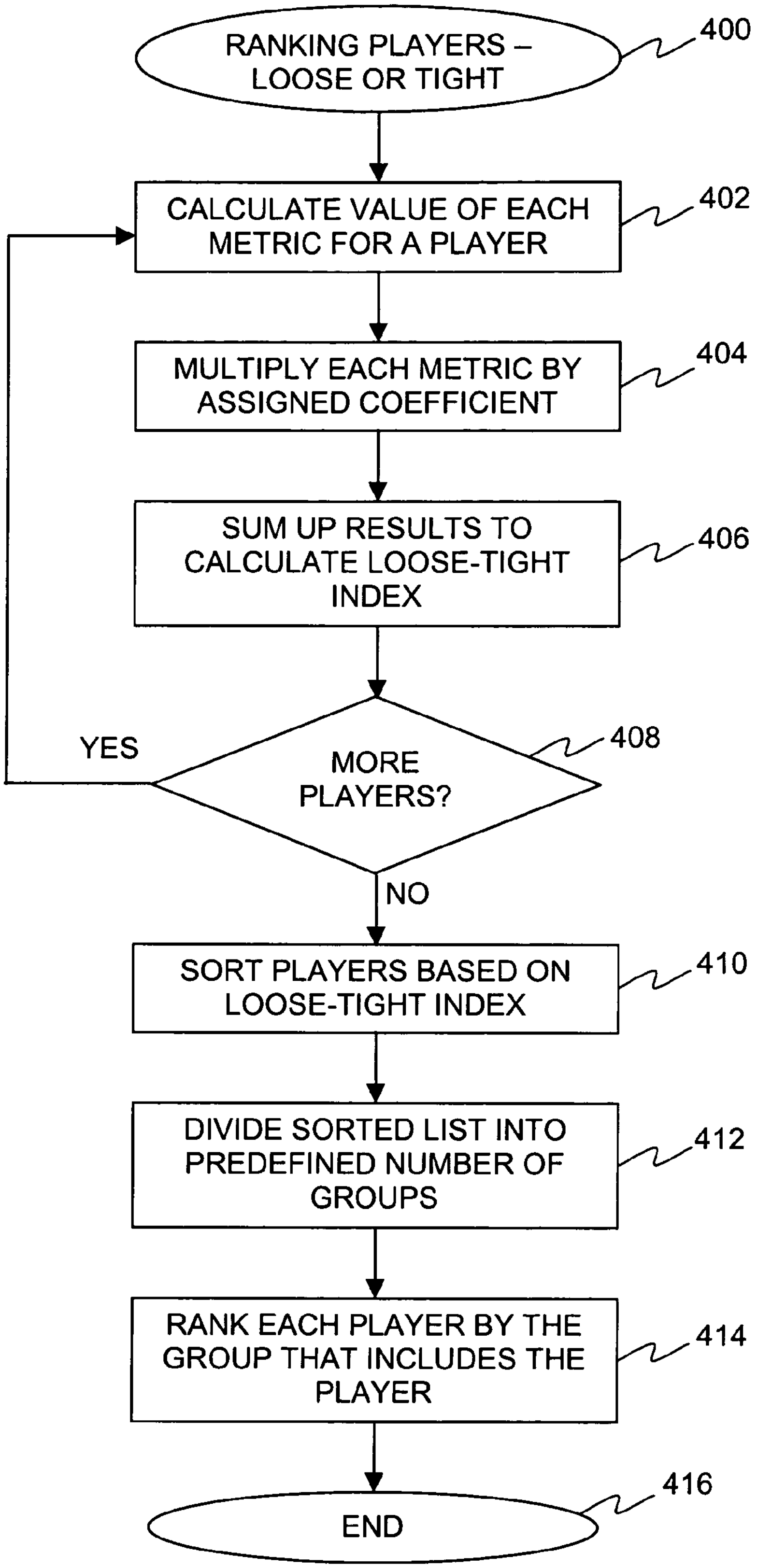
FIG. 4 is a flow chart of a process of providing loose-tight rankings to players of the card game session being monitored by the process of FIG. 2, in accordance with embodiments of the present invention.

FIG. 4 is a flow chart of a process of providing loose-tight rankings to players of the card game session being monitored by the process of FIG. 2, in accordance with embodiments of the present invention. The process of ranking players as loose or tight begins at step 400. In step 402, a value for each metric for a player is calculated. The one or more metrics are related to a player being loose or tight. The metrics can be, for example, at least one of the percentage of hands played pre-flop, percentage of hands played on the flop, percentage of hands played on the turn, percentage of times a player VP$IP (voluntarily put money in pot), etc. Each metric is assigned a coefficient (i.e., a weight) by the monitoring system.

In step 404, each metric is multiplied by the assigned coefficient. In step 406, the results of step 404 are summed to calculate a loose-tight index. Inquiry step 408 determines if there are one or more additional players for which an index is to be calculated. If there are additional players, the loose-tight ranking process repeats starting at step 402. If there are no additional players, then step 410 sorts the players based on their associated loose-tight indices. In step 412, the sorted list of players is divided into a number of predefined groups (e.g., 10 groups). In step 414, each player is ranked based on the step 412 group that includes the player.

In one embodiment, the process of FIG. 4 treats the statistics for a player's short handed and full games separately. This option can be configures by the user.

Figure 5:
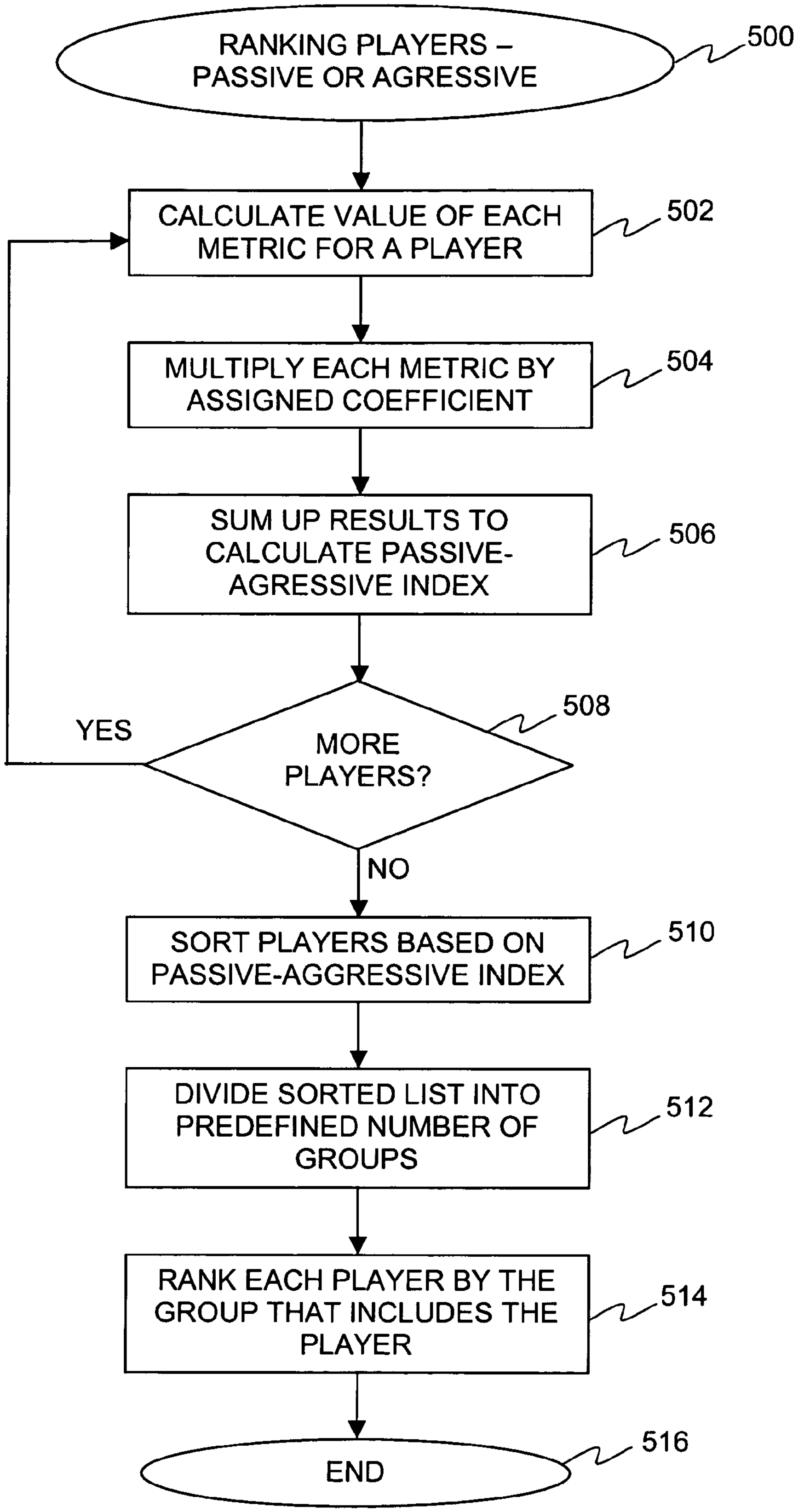
FIG. 5 is a flow chart of a process of providing passive-aggressive rankings to players of the card game session being monitored by the process of FIG. 2, in accordance with embodiments of the present invention.

FIG. 5 is a flow chart of a process of providing passive-aggressive rankings to players of the card game session being monitored by the process of FIG. 2, in accordance with embodiments of the present invention. The process of ranking players as passive or aggressive begins at step 500. In step 502, a value for each metric for a player is calculated. The one or more metrics are related to a player being passive or aggressive. The metrics can be, for example, at least one of the percentage of hands raised, percentage of hands re-raised, percentage of hands check raised, the ratio of the percentage of hands bet to the percentage of hands checked, the ratio of the percentage of hands raised to the percentage of hands called, etc. Each metric is assigned a coefficient (i.e., a weight) by the monitoring system.

In step 504, each metric is multiplied by the assigned coefficient. In step 506, the results of step 504 are summed to calculate a passive-aggressive index. Inquiry step 508 determines if there are one or more additional players for which an index is to be calculated. If there are additional players, the passive-aggressive ranking process repeats starting at step 502. If there are no additional players, then step 510 sorts the players based on their associated passive-aggressive indices. In step 512, the sorted list of players is divided into a number of predefined groups (e.g., 10 groups). In step 514, each player is ranked based on the step 512 group that includes the player.

Alert Details

FIG. 6 is an example of alert details provided by the process of FIG. 2, in accordance with embodiments of the present invention. In response to selecting an alert indicator of table view 300 (see FIG. 3), a window 600 is displayed that includes alert details for a player. The alerts can be related to hand frequency analysis (e.g., the player has played in 2 of the last 9 hands). Other types of alerts are described below.

Hands played out of position: These alerts facilitate a user noticing the hands played by his or her opponents. Instead of memorizing each hand played by an opponent, it is often easier to notice and identify the hands the opponent was not supposed to play according to standard poker strategy. This strategy is modifiable by the user. FIG. 6B is a flow chart of an algorithm used by the monitoring system to identify hands played out of position. The process of identifying hands played out of position starts at step 620. In step 622, a data structure is created to represent all combinations of table sizes and player positions for each table size. Player positions are identified relative to the button. For each possible combination of player position at each table size, step 624 populates the data structure with correct/valid starting hands (i.e., the strategically correct play for each starting hand based on each table size-player position combination). Based on the table size and player position, step 626 identifies any hand play which is not present in the data structure as a hand played out of position. The process of FIG. 6B ends at step 628.

Standard raising hand not raised pre-flop (a hand normally raised pre-flop was not raised): These alerts facilitate a user noticing the hands in which his or her opponents raise, and the circumstances of the raise. There is a difference in analysis of the raise if a hand is raised when a player is “first-in” (i.e., first player to put additional money in the pot) or not. FIG. 6C is a flow chart of an algorithm used by the monitoring system to identify standard raising hands that were not raised pre-flop. The process of identifying standard raising hands that were not raised pre-flop starts at step 640. In step 642, a data structure is created to represent all combinations of table sizes and player positions for each table size. Player positions are identified relative to the button. For each possible combination of player position at each table size, step 644 populates the data structure with correct/valid raising hands for both first-in and not first-in conditions. The correct/valid hands can be configured by the user. Based on the table size and player position, step 646 flags any hand that is not raised first-in, and that is in the data structure for the first-in condition. Based on the table size and player position, step 648 flags any hand that is not raised when not first-in, and that is in the data structure for the not first-in condition. The process of FIG. 6C ends at step 650.

Non-standard raising hands raised pre-flop (a hand not normally raised pre-flop was raised): These alerts facilitate users noticing the hands their opponents raise with and the circumstances of the raise. FIG. 6D is a flow chart of an algorithm used by the monitoring system to identify non-standard raising hands that were raised pre-flop. The process of identifying non-standard raising hands that were raised pre-flop starts at step 660. In step 662, a data structure is created to represent all combinations of table sizes and player positions for each table size. Player positions are identified relative to the button. For each possible combination of player position at each table size, step 664 populates the data structure with correct/valid raising hands for both first-in and not first-in conditions. The correct/valid hands can be configured by the user. Based on the table size and player position, step 666 flags any raised hand that was raised when first-in, and that is not in the data structure for the first-in condition. Based on the table size and player position, step 668 flags any raised hand that was raised when not first-in, and that is not in the data structure for the not first-in condition. The process of FIG. 6D ends at step 670.

Check Raises: Using the Canonical Representation of a hand, a check raise is identified by an action list with a Raise or Re-raise Action following a check action. The Canonical Representation of a hand is described in the Canonical Representation section below. Any action list which contains a Raise Action or Re-raise Action, which is preceded by a Check Action is a Check Re-raise. The Check Action need not immediately precede the Raise or Re-raise. For example, the sequence “Check, Call, Raise” is considered a check raise.

Cold Call Pre-Flop: Using the Canonical Representation of a hand, a Cold Call occurs when all the following statements are true:

(1) The hand has been raised or re-raised on the current round.
(2) All players between the raiser or re-raiser and the Player have folded.
(3) The Player has not already put any money in the pot on the current round.
(4) The Player action is Call.

Steal Attempts: Using the Canonical Representation of a hand, a Player is said to attempt to steal when all the following statements are true:

(1) The round is the Pre-Flop round.
(2) The player position is the button or one off the button.
(3) All the players between the Big Blind and the player have folded.
(4) The Player action is Raise.

Bluffs on the River: Using the Canonical Representation of a hand, a Player is identified as bluffing on the River when all the following statements are true:

(1) The round is the River round.
(2) The player’s hand is at most High Card.
(3) The player action is bet, raise, or re-raise.

River Calls with second best or worse hands: Using the Canonical Representation of a hand, a Player is identified as calling on the River with second best hand when all the following statements are true:

(1) The round is the River round.
(2) The Player Calls.
(3) The Player does not fold
(4) The Player does not win any part of the pot.

Called without pot odds: Using the Canonical Representation of a hand, a Player is identified as calling without pot odds when the following statements are true:

(1) The player currently has an inside straight draw (11-1 odds), an outside straight draw (5-1 odds) or a 4 flush draw (4-1 odds).

(2) The Player calls.

(3) The size of the pot before the Player calls divided by the amount called is less than the odds of the draw.

For example, assume a player has an inside straight draw, and calls 2$ in a 8$ pot. The drawing odds are 11-1, and the pot odds are 8/2=4, which is less than 11. In this case, the player is calling without having pot odds.

Called raise with dominated hand: Players who call a raise or re-raise pre-flop with the following hands are likely to be dominated by the pre-flop raiser:

AJ, A10, A9, A8, A7, A6, A5, A4, A3, A2

K-J, K-10

QJ, QT

The above list of hands can be configured by the user.

Using the Canonical Representation of a hand, a Player is identified as having called with a dominated hand when all of the following are true:

(1) The round is the Pre-Flop round.

(2) Another player has raised.

(3) The player calls or re-raises with one of the hands in the dominated list.

Raising to get a free card: Using the Canonical Representation of a hand, a Player is identified as raising to get a free/cheap card when all of the following are true:

(1) The round is the Flop round.

(2) The Player is on the button or one off the button.

(3) No other player has raised.

(4) The Player currently has an inside straight draw, an outside straight draw or a 4 flush draw.

(5) The Player Raises.

Figure 7:
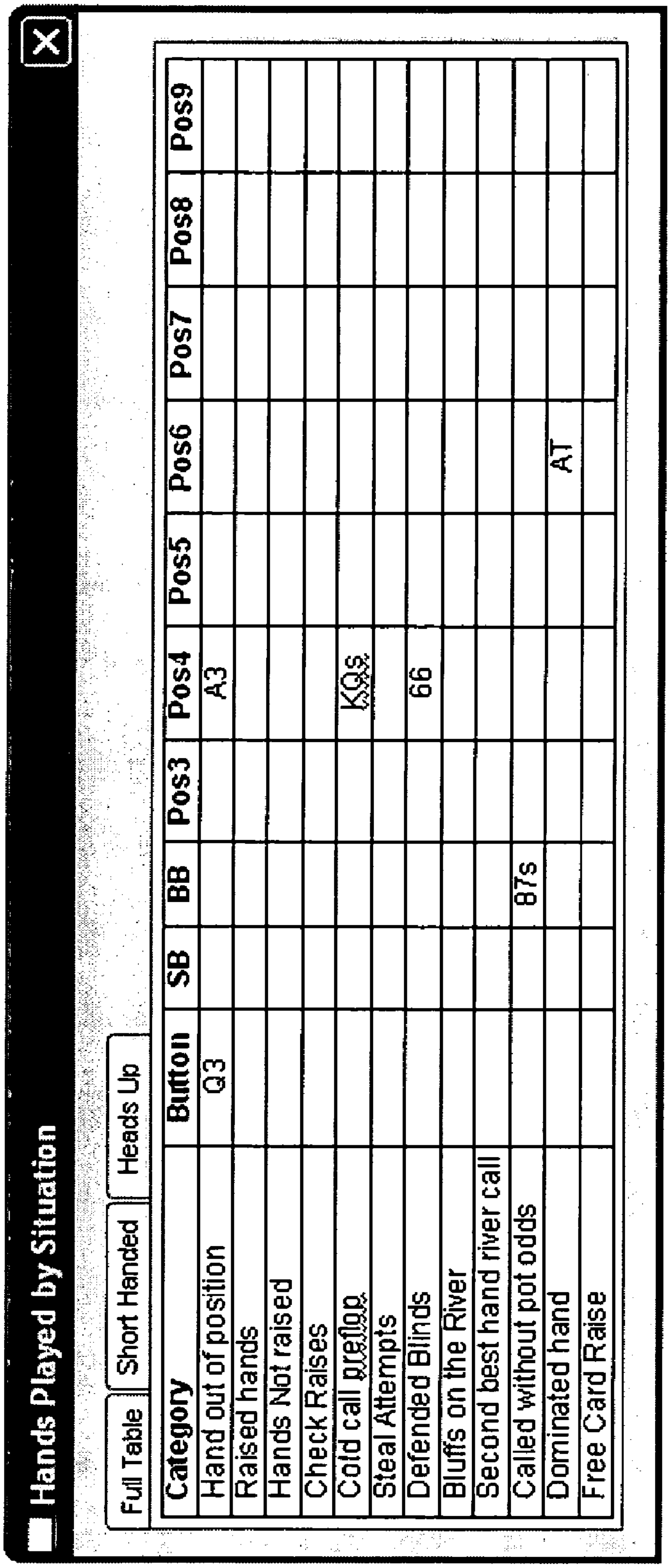
FIG. 7 is an image of a table including a summary of known hands based on predefined conditions during the process of FIG. 2, in accordance with embodiments of the present invention.

FIG. 7 is an image of a table including a summary of known hands based on predefined conditions during the process of FIG. 2, in accordance with embodiments of the present invention. In response to the user selecting a link (e.g., an icon) on table view 300 (see FIG. 3), the monitoring system displays table 700 on the user's computing system, which includes a summary of known hands played by a player under certain predefined conditions. This approach to summarizing hands is a novel alternative to conventional schemes that list a percentage of time a player makes a specific play. In one embodiment, table 700 includes multiple views, where each view is selected by the user (e.g., by selecting a tab of multiple tabs), and each view of the multiple views summarize known hands for predefined conditions in full table, short handed or heads up table situations. Each hand listed in table 700 includes a selectable link to a play-by-play summary of how that hand was played.

Figure 6A:
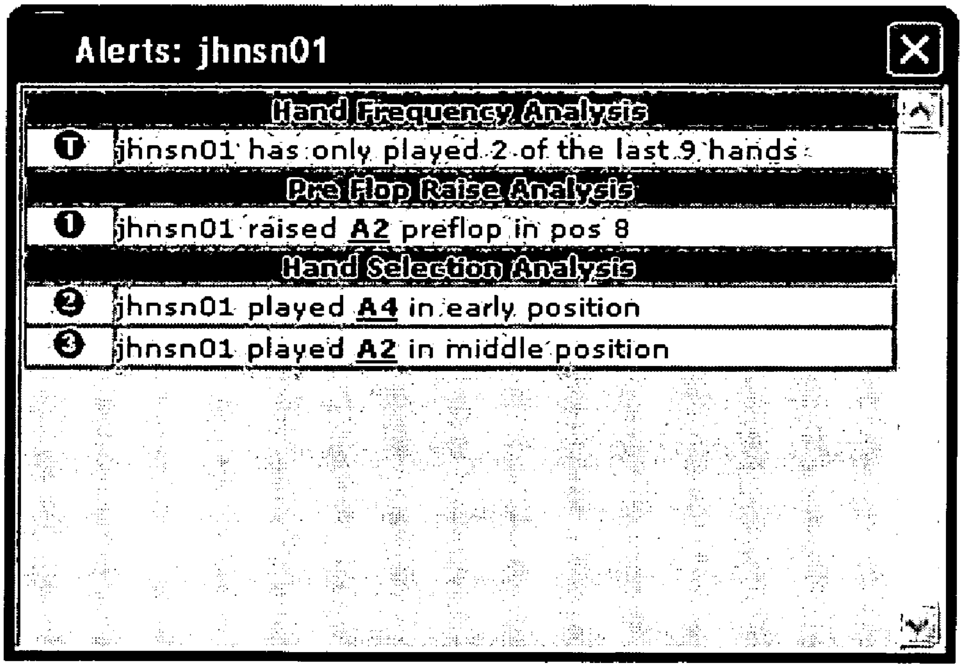
FIG. 6A is an example of alert details provided by the process of FIG. 2, in accordance with embodiments of the present invention.
Figure 6B:
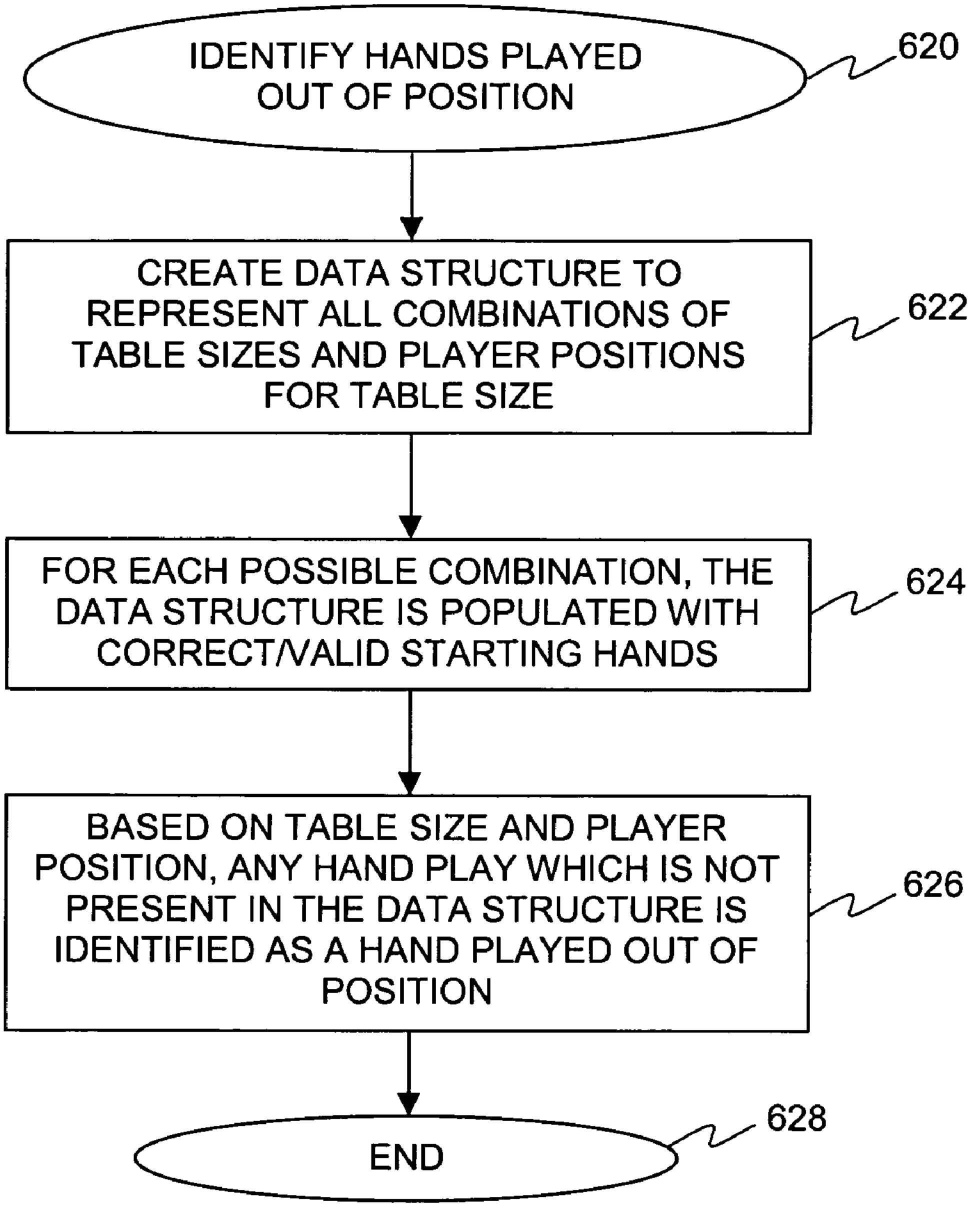
FIG. 6B is a flow chart of a process of determining alert details of FIG. 6A, where the alert details identify hands played out of position, in accordance with embodiments of the present invention.
Figure 6C:
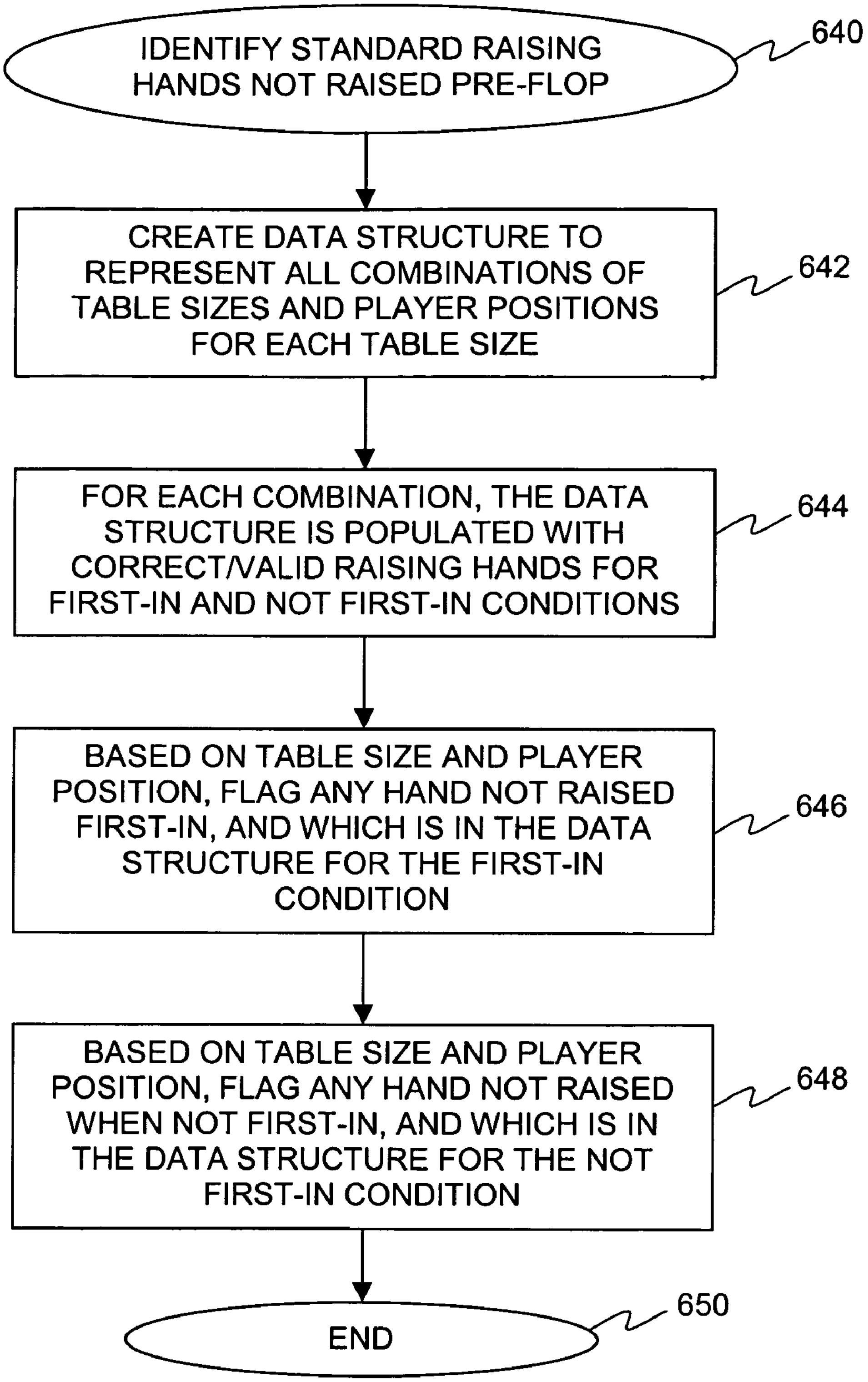
FIG. 6C is a flow chart of a process of determining alert details of FIG. 6A, where the alert details identify standard raising hands not raised pre-flop, in accordance with embodiments of the present invention.
Figure 6D:
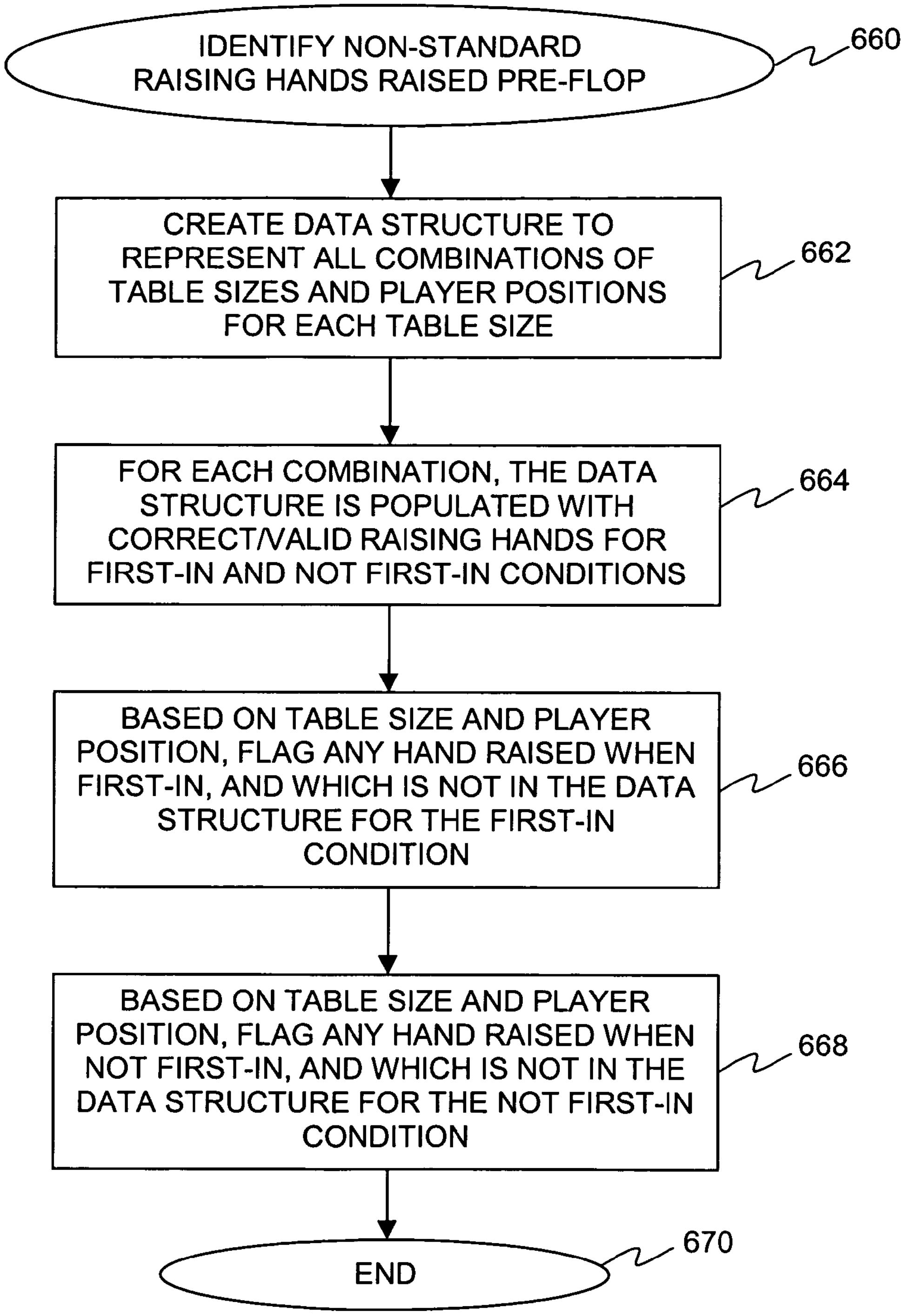
FIG. 6D is a flow chart of a process of determining alert details of FIG. 6A, where the alert details identify non-standard raising hands raised pre-flop, in accordance with embodiments of the present invention.

The category names of table 700 are any combination of one or more predefined conditions associated with the alert categories listed above relative to FIG. 6A (e.g., hand played out of position). In one embodiment, other alert categories not listed above can be added to table 700.

Figure 8A:
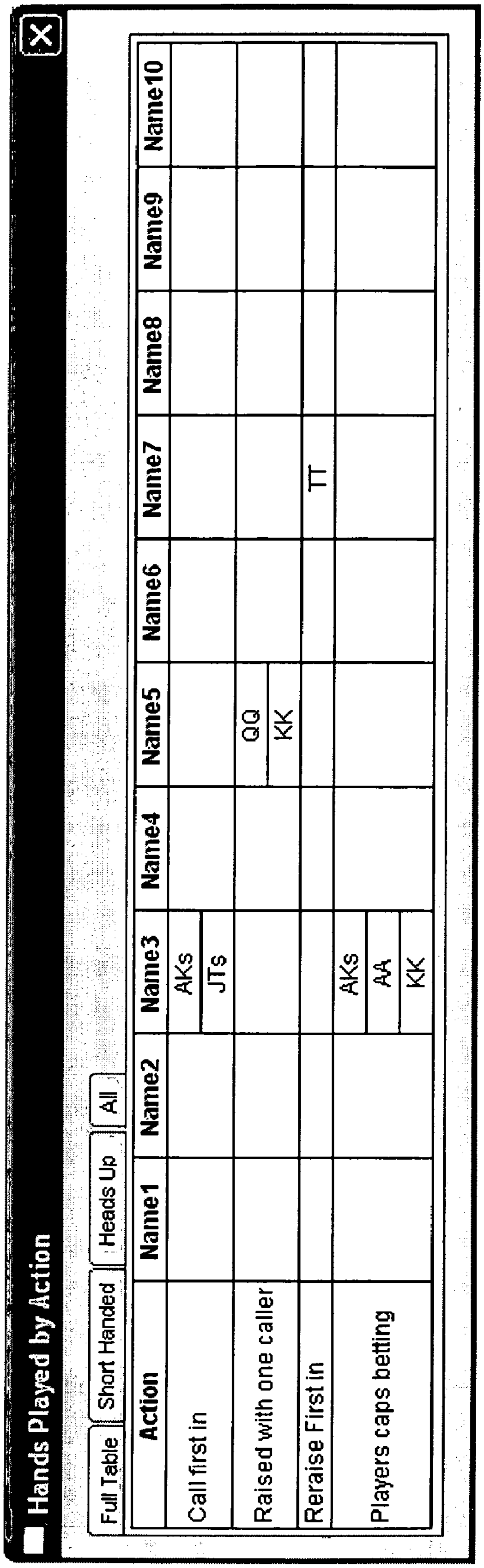
FIG. 8A is a table for displaying, during the process of FIG. 2, hands played previously in similar predefined situations, in accordance with embodiments of the present invention.

FIG. 8A is a table for displaying, during the process of FIG. 2, hands played previously in similar predefined situations, in accordance with embodiments of the present invention. Based on predefined pre-flop situations, the monitoring system displays hands a player has played previously in similar situations in a user interface, such as a table 800, which has situation categories in the first column, and player names in the subsequent columns. The entries in table 800 are the hands each player played before in each situation listed in the first column. The display of table 800 is automatic based on the play of a hand in progress. Table 800 separates hands played at full, short handed and heads up tables. In one embodiment, full table, short handed and heads up views of table 800 are separate, user-selectable views.

An example of the play of a hand that results in the entries of table 800 is included in a list 820 of plays shown in FIG. 8B. List 820 includes plays 821-835. For example, Name3's first in call in play 823 results in the hand entries (i.e., AKs and JTs) being shown under the Name3 column and in the Call first in row of table 800 (see FIG. 8A). That is, AKs and JTs are previous hands played by player Name3 when Name3 was a first in caller in the same position as Name3's current position. As play progresses to play 825 of FIG. 8B, table 800 (see FIG. 8A) is updated. Since play 825 by player Name5 fits into the Raised with one caller category of table 800, table 800 is updated to include the previous hands QQ and KK that Name5 played in the same position when Name5 was raising with one caller.

The predefined pre-flop situations that can be utilized by table 800 are included in a list 850 shown in FIG. 8C. Algorithms to detect the predefined pre-flop situations of list 850 are listed in the Pre-Flop Situations section presented below.

In one embodiment, a "particular position" in the predefined pre-flop situations of FIG. 8C is the number of a position from the button that a player is seated. In another embodiment, positions in the case of full games (i.e., 7 or more players) are grouped together to reduce the possible outcomes. For example, in a 10-handed game (i.e., a full game), Early position is a first group defined as the first 3 seats after the Big Blind; Middle position is a second group defined as the next 3 seats after the Early positions; and Late position is a third group defined as the next 2 seats after the Middle positions.

In one embodiment, the monitoring system is user-configurable to disregard the position altogether, in which case the monitoring system displays in table 800 all hands played in any position for a particular condition. That is, the monitoring system displays all hands that meet the condition that were played in position 1, and were played in position 2, and were played in position 3, etc.

Figure 9A:
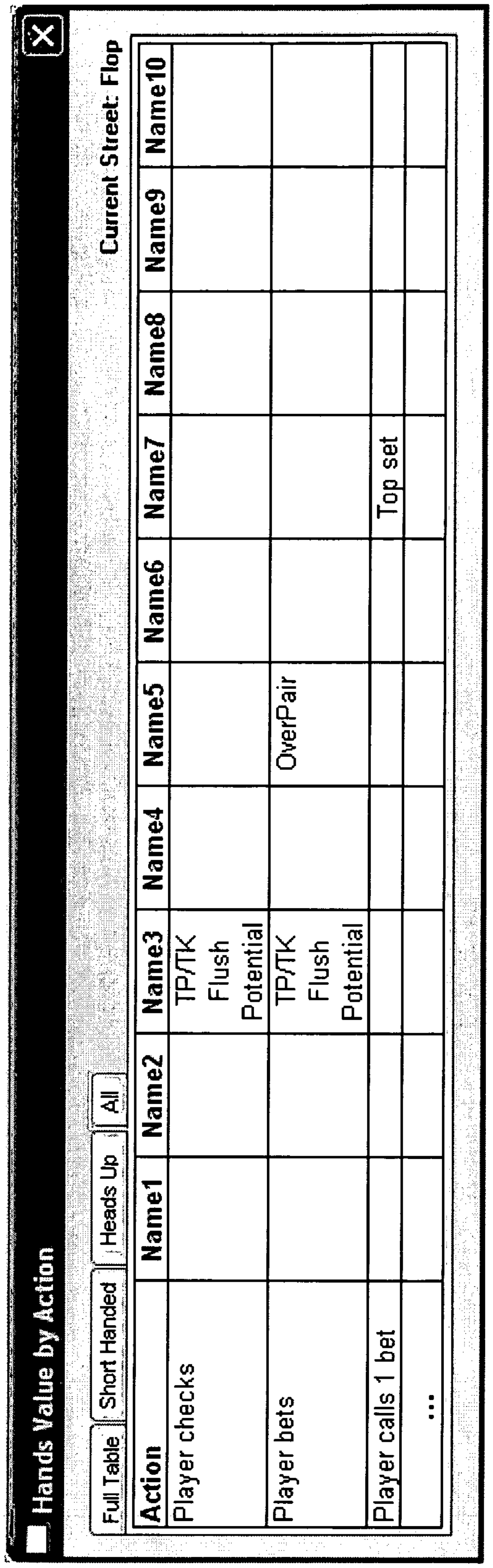
FIG. 9A is a table for displaying, during the process of FIG. 2, hands played previously with specified actions in situations identical to a player's current situation, in accordance with embodiments of the present invention.

FIG. 9A is a table for displaying, during the process of FIG. 2, hands played previously with specified actions in situations identical to a player's current situation, in accordance with embodiments of the present invention. Based on a player's current action on a street, the monitoring system automatically displays in a table 900 hands that the player has played with that action previously in the same situations. Table 900 includes a first column of categories of actions, and other columns labeled with names of players. Each entry in table 900 is a value of a player's hand. As the play of each player unfolds, the monitoring system automatically detects the current situation, and highlights the cells of table 900 for which the current situation applies. The user has the option to filter all plays, and only list plays relevant to the current hands. In one embodiment, all known hand values for each player action and street are displayed. The display of all known hand values provides an overview of the types of hand values a player has shown he or she is capable of having when making each play. As the hand in progress is played, the hand values relevant to the current hand in progress are highlighted. In another embodiment, only the hand values for the current hand in progress are displayed.

In the context of FIG. 9A, a situation is defined as the value of the player's hand (see hands in Appendix C and Appendix D) together with the texture of the board (see Appendix E). As used herein, the value of a hand is defined as the player's two hole cards and the community cards (a.k.a., the board).

Table 900 separates hands played at a full table from hands played short handed. In one embodiment, full table and short handed views of table 900 are separate, user-selectable views.

The possible actions in the category column of table 900 include a list 910 of actions shown in FIG. 9B. In list 910, a super action is an action considered to be the same as the action it is a super action of. For example, a player willing to call three bets must also be willing to call one bet. Thus, calling three bets is a super action of calling one bet. Therefore, when searching for hands where a player has called one bet, the monitoring system also considers hands where the player has called three bets.

As an example of displaying table 900, consider live play in which the flop is dealt. The player in seat number 3 bets. The monitoring system displays all hands, based on Appendix C and Appendix D, where this player has bet in the past based on the texture of the board. Alternatively, the monitoring system displays the hole cards and the cards making up the board when the player played the hand.

Figure 9C:
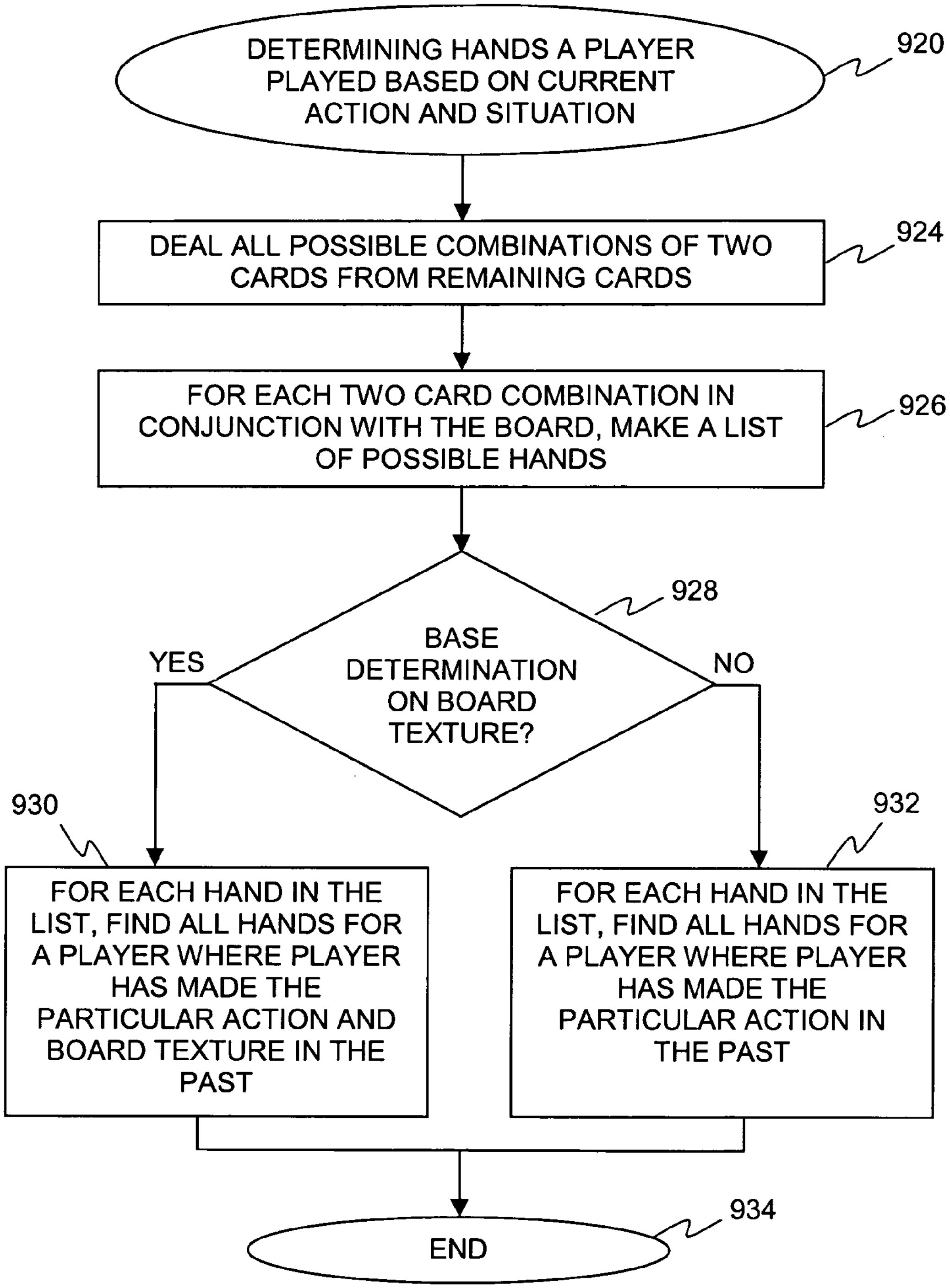
FIG. 9C is a flow chart of a process for determining hands a player played in the past based on the player's current action and situation, in accordance with embodiments of the present invention.

FIG. 9C is a flow chart of a process for determining hands a player played in the past based on the player's current action and situation. The process of FIG. 9C begins at step 920. In step 924, the monitoring system determines all possible hands that can be made with the current board. All possible combinations of two cards are dealt from the remaining cards (i.e., not including the known cards on the board and any known hole cards). For each two-card combination in conjunction with the board, step 926 makes a list of the possible hands that can be made (see Appendix C and Appendix D). One example of a possible hand is a Top Pair/Top Kicker with Inside Straight Potential. If inquiry step 928 determines that the result of the process of FIG. 9C is to be based partly on board texture, then step 930 finds, for each hand in the list of step 926, all hands for a player where the player has made the particular action and board texture in the past. If inquiry step 928 determines that board texture is not be a basis for the FIG. 9C result, then step 932 finds, for each hand in the list of step 926, all hands for a player where the player has made the particular action in the past.

Figure 9D:
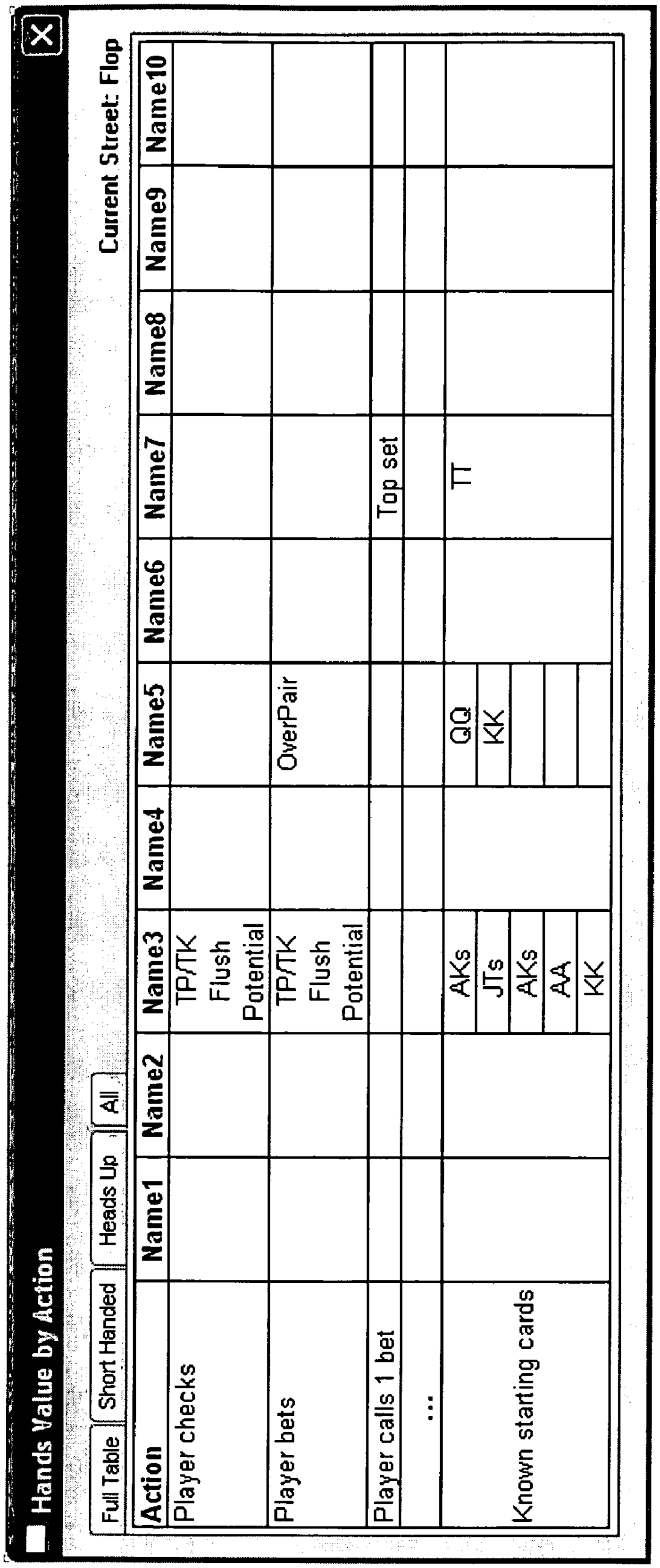
FIG. 9D is a table combining information from the tables of FIGS. 8A and 9A, in accordance with embodiments of the present invention.

FIG. 9D is a table combining information from the tables of FIGS. 8A and 9A, in accordance with embodiments of the present invention. In one embodiment, the monitoring system displays hand information in a table 970 that includes the information from table 800 (see FIG. 8*a*) and table 900 (see FIG. 9A).

FIG. 10 is an image of the pre-flop teaching aid displayed in the process of FIG. 10A, in accordance with embodiments of the present invention. Window display 1000 includes the correct circumstances to play the user's current hand. The monitoring system detects the cards dealt to the user, and automatically displays window 1000, which includes at least one item of the following items of information:

(1) category of the user's current hand;

(2) type of game that the hand plays well and/or does not play well;

(3) how to play the hand in an unraised pot;

(4) how to play the hand in a raised pot; and (5) examples and detailed information to enhance the user's understanding of items (1)-(4).

Instead of merely providing advice to Bet, Raise or Fold, the teaching aid provided by window 1000 tells the user why it is correct and/or incorrect to play the user's current hand. In the A7s hand in the FIG. 10 example, the teaching aid informs the user that the A7s hand plays well in loose passive games. Further, if the game is passive, the user can play the hand in any position if there is already one or more callers in the pot. Still further, if it is a raised pot, the user should usually fold, and the pot must by multi-way for the A7s hand to be profitable. In one embodiment, the user makes a selection on an interface provided by the monitoring system to display the teaching aid continually during an online card game session. In response to the user's selection to display the teaching aid, the teaching aid window is then automatically displayed, automatically populated with the user's current hand and the above-described information, and automatically updated as the user is dealt a subsequent hand.

Computing System

Figure 11:
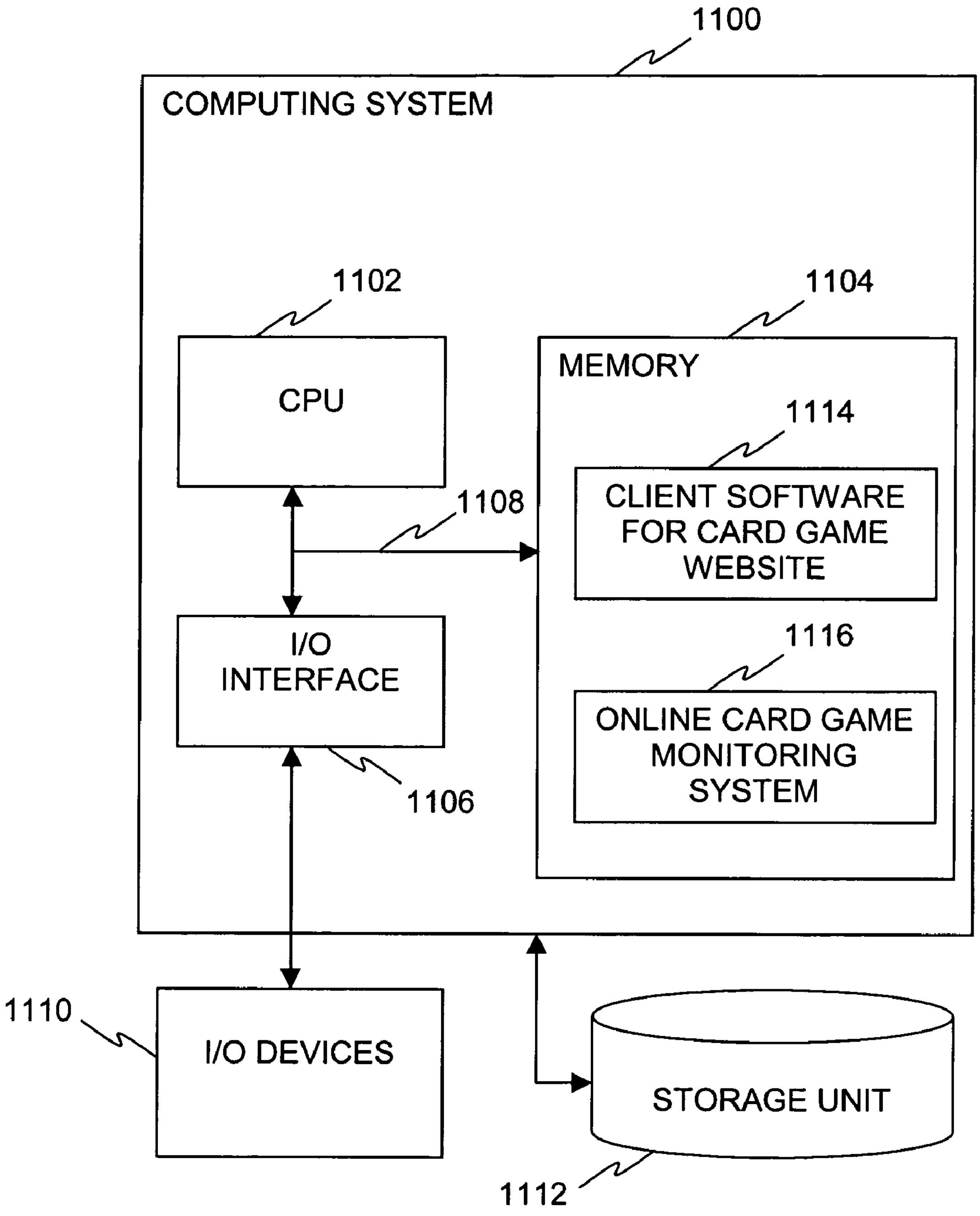
FIG. 11 is a block diagram of a computing system implementing the process of FIG. 2, in accordance with embodiments of the present invention.

FIG. 11 is a block diagram of a computing system implementing the process of FIG. 2, in accordance with embodiments of the present invention. Computing system 1100 is an implementation of one of the user computing systems 102, 104, 106 of FIG. 1. Computing system 1100 generally comprises a central processing unit (CPU) 1102, a memory 1104, an input/output (I/O) interface 1106, a bus 1108, I/O devices 1110 and a storage unit 1112. CPU 1102 performs computation and control functions of computing system 1100. CPU 1102 may comprise a single processing unit, or be distributed across one or more processing units in one or more locations (e.g., on a client and server). Memory 1104 may comprise any known type of data storage and/or transmission media, including magnetic media, optical media, random access memory (RAM), read-only memory (ROM), a data cache, a data object, etc. Storage unit 1112 is, for example, a magnetic disk drive or an optical disk drive. Storage unit 1112 stores log files with data (e.g., hand histories) provided by the online card game website residing on server 108 (see FIG. 1). Moreover, similar to CPU 1102, memory 1104 may reside at a single physical location, comprising one or more types of data storage, or be distributed across a plurality of physical systems in various forms. Further, memory 1104 can include data distributed across, for example, a LAN, WAN or storage area network (SAN) (not shown).

I/O interface 1106 comprises any system for exchanging information to or from an external source. I/O devices 1110 comprise any known type of external device, including a display monitor, keyboard, mouse, printer, speakers, handheld device, printer, facsimile, etc. Bus 1108 provides a communication link between each of the components in computing system 1100, and may comprise any type of transmission link, including electrical, optical, wireless, etc.

I/O interface 1106 also allows computing system 1100 to store and retrieve information (e.g., program instructions or data) from an auxiliary storage device, such as a non-volatile storage device (e.g., a CD-ROM drive which receives a CD-ROM disk) (not shown). Computing system 1100 can store and retrieve information from other auxiliary storage devices (not shown), which can include a direct access storage device (DASD) (e.g., hard disk or floppy diskette), a magneto-optical disk drive, a tape drive, or a wireless communication device.

Memory 1104 includes computer program code comprising client software 1114 associated with a card game website (e.g., online poker room) accessible from server 108 (see FIG. 1) via network 110 (see FIG. 1), and an online card game monitoring system 1116 that includes program code that implements the process of FIG. 2. In another embodiment, client software 1114 and monitoring system 1116 reside on different computing systems. Client software 1114 can be, for example, PartyPoker.com poker room software offered by WPC Productions Limited. Further, memory 1104 may include other systems not shown in FIG. 11, such as an operating system that runs on CPU 1102 and provides control of various components within and/or connected to computing system 1100.

The invention can take the form of an entirely hardware embodiment, an entirely software embodiment, an embodiment containing both hardware and software elements, or a distributed system. In a preferred embodiment, the invention is implemented in software, which includes but is not limited to firmware, resident software, microcode, etc.

Furthermore, the invention can take the form of a computer program product accessible from a computer-usable or computer-readable medium providing program code 1114 and 1116 for use by or in connection with a computing system 1100 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM, ROM, a rigid magnetic disk and an optical disk. Current examples of optical disks include compact disk-read-only memory (CD-ROM), compact disk-read/write (CD-R/W) and DVD.

A computing system 1100 suitable for storing and/or executing program code 1114 and 1116 includes at least one processor 1102 coupled directly or indirectly to memory elements 1104 through a system bus 1108. The memory elements can include local memory employed during actual execution of the program code, bulk storage, and cache memories which provide temporary storage of at least some program code in order to reduce the number of times code must be retrieved from bulk storage during execution.

Furthermore, the present invention discloses a method for deploying or integrating computing infrastructure, comprising integrating computer-readable code into computer system 1100, wherein the code in combination with computer system 1100 is capable of providing the online card game monitoring technique described herein. The disclosed method for deploying or integrating computing infrastructure with the capabilities described herein can be offered as a service on a subscription service.

The sequence diagrams or flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims While embodiments of the present invention have been described herein for purposes of illustration, many modifications and changes will become apparent to those skilled in the art. Accordingly, the appended claims are intended to encompass all such modifications and changes as fall within the true spirit and scope of this invention.

APPENDIX A

Pre-Flop Situations

Pre-flop situations relative to the table of hands displayed in FIG. 8 are presented below. The series of conditions or algorithms defining each pre-flop situation are presented by way of example. There may be variations in the conditions/algorithms without departing from the spirit of the present invention.

1. Player Calls 1 Bet in a Particular Position when First in

Using the Canonical Representation of a hand, a Player is said to call 1 bet in a particular position when first in if all of the following are true:

- The round is the Pre-Flop round.
- The player is in said position.
- The Player is not in the Small Blind or the Big Blind.
- All players between the player in the Big Blind and the Player have folded.
- The Player Calls.

2. Player Calls 1 Bet in a Particular Position with 1 Caller Already in Hand

Using the Canonical Representation of a hand, a Player is said to call 1 bet in a particular position with a caller already in the hand when all of the following are true:

- The round is the Pre-Flop round.
- The player is in said position.
- The Player is not in the Small Blind or the Big Blind.
- Precisely 1 player between the player in the Big Blinds and the Player has called, and all other players folded.
- The Player Calls.

3. Player Calls 1 Bet in a Particular Position with 2 or More Callers Already in Hand (Call Multihanded)

Using the Canonical Representation of a hand, a Player is said to call 1 bet in a particular position with 2 or more callers already in the hand when all of the following are true:

- The round is the Pre-Flop round.
- The player is in said position.
- The Player is not in the Small Blind or the Big Blind.
- 2 or more players between the player in the Big Blind and the Player have called, and all other players folded
- The Player Calls.

4. Player Calls 2 or More Bets in a Particular Position

Using the Canonical Representation of a hand, a Player is said to call 2 or more bets in a particular position when all of the following are true:

- Player is in said position.
- A player calls an amount equal or greater than 2 bets in addition to what he has already put into the pot.

5. Player Raises in a Particular Position when First in

Using the Canonical Representation of a hand, a Player is said to have raised first-in in a particular position when all of the following are true:

- The round is the Pre-Flop round.
- The player is in said position.
- The Player is not in the Small Blind or the Big Blind.
- All players between the player in the Big Blind and the Player have folded.
- The Player action is Raise.

6. Player Raises in a Particular Position with 1 Caller Already in Hand

Using the Canonical Representation of a hand, a Player is said to have raised in a particular position with a caller already in the hand when all of the following are true:

- The round is the Pre-Flop round.
- The player is in said position.
- The Player is not in the Small Blind or the Big Blind.
- Precisely 1 player between the player in the Big Blind and the Player has called, and all other players folded.
- The Player action is Raise.

7. Player Raises in a Particular Position with 2 or More Callers Already in Hand Using the Canonical Representation of a hand, a Player is said to have raised in a particular position with 2 or more callers already in the hand when all of the following are true:

The round is the Pre-Flop round.

The player is in said position.

The Player is not in the Small Blind or the Big Blind.

2 or more players between the player in the Big Blind and the Player have called, and all other players folded.

The Player action is Raise.

8. Player Re-Raises in a Particular Position when There are no Callers After the Raiser (Re-Raise First in)

Using the Canonical Representation of a hand, a Player is said to have Re-raised first in when all of the following are true:

The round is the Pre-Flop round.

Player is in said position.

The Player is not in the Small Blind or the Big Blind.

Precisely 1 player has raised.

All players between the raiser in the Player have folded.

The Player action is Raise.

9. Player Re-Raises in a Particular Position when There is 1 or More Callers After the Raiser Using the Canonical Representation of a hand, a Player is said to have Re-raised when there is 1 or more callers after the raiser when all of the following are true:

The round is the Pre-Flop round.

Player is in said position.

The Player is not in the Small Blind or the Big Blind.

Only 1 player has raised.

1 or more players between the raiser in the Player have called.

The Player action is Re-raise.

10. Player Caps the Betting in a Particular Position when 1 Player has yet to Fold Using the Canonical Representation of a hand, a Player is said to cap the betting when 1 player has yet to fold when all of the following are true:

The round is the Pre-Flop round.

Player is in said position.

All players but the Player and 1 other player have folded.

The Player action is re-raise.

The raise is the Nth one on the round where N is the maximum number of raises allowed.

11. Player Caps the Betting in a Particular Position when 2 or More Player have yet to Fold Using the Canonical Representation of a hand, a Player is said to cap the betting when 2 or more players have yet to fold when all of the following are true:

The round is the Pre-Flop round.

Player is in said position.

At least 2 players in addition to the Player have yet to fold.

The Player action is re-raise.

The raise is the Nth one on the round where N is the maximum number of raises allowed.

12. Player Call-Raises from a Particular Position

Using the Canonical Representation of a hand, a Player is said to call-raise when all of the following are true:

The round is the Pre-Flop round.

Player is in said position.

The Player action is Raise.

The Player has previously called on this round.

13. Player Attempts a Steal from the Button or the Cut-Off

Using the Canonical Representation of a hand, a Player is said to attempt a steal from the button or the cut-off when all of the following are true:

The round is the Pre-Flop round.

Player is in said position (button or cut-off).

All players between the Big Blind and the Player have folded.

The Player action is Raise.

14. Player Defends Small Blind

Using the Canonical Representation of a hand, a Player is said to defend the Small Blind when all of the following are true:

The round is the Pre-Flop round.

Player is in the Small Blind.

Another player attempts a Steal from the Button or the Cutoff (see steal from the button algorithm).

The Player action is Call or Raise.

15. Player Defends Big Blind

Using the Canonical Representation of a hand, a Player is said to defend the Big Blind when all of the following are true:

The round is the Pre-Flop round.

Player is in the Big Blind.

Another player attempts a Steal from the Button or the Cutoff (see steal from the button algorithm).

The Small Blind Folds.

The Player action is Call or Raise.

OR

The round is the Pre-Flop round.

Player is in the Big Blind.

All players but the blinds have folded.

The Small Blind Raised.

The Player action is Call or Raise.

APPENDIX B

Canonical Representation

Many of the algorithms presented above are based on the canonical representation of a hand. The Canonical representation of a hand is the play by play of a hand in structure 1200 of FIG. 12. The Canonical Representation structure 1200 includes the following:

Community Cards column: represents the cards dealt on each street.

NameX columns: represent the actions taken by a player on each street.

Dealer row: identifies the player who is the dealer

Dealt row: stores any known cards for a player

Pre-Flop row: identifies the action Pre-Flop

Flop row: identifies the action on the Flop

Turn row: identifies the action on the Turn

River row: identifies the action on the River

Showdown row: identifies the action at the Showdown

Win/Loss row: identifies the win/loss

An Action List entry in the Canonical Representation represents the ordered actions taken by a player on a street. Possible actions are shown in the following table:

| Action | Description |
|---|---|
| Post XXX | Player Posts XXX while not in the small blind or big blind |
| SB XXX | Player Posts Small Blind of XXX |
| BB XXX | Player Posts Big Blind of XXX |
| Fold | Player Folds |
| Call XXX | Player Calls XXX |
| Bets XXX | Player Bets XXX |
| Raise XXX | Player Raises XXX |
| ReRaise XXX | Player ReRaises XXX |
| Returned XXX | Player was returned XXX |

Any play by play of a hand can be converted to canonical form by filling structure 1200 with the correct action for each player on each street. As one example, consider that the play of a hand is as follows:

Pre Flop Play
- Name1 posts small blind 100
- Name2 posts big blind 200
- Name3 calls 200
- Name4 Folds
- Name5 Raises 400
- Name6 Folds
- Name7 Re-raises 800
- Name8 Folds
- Name9 Folds
- Name10 Folds
- Name1 Folds
- Name2 Folds
- Name3 Re-raises 1200
- Name5 Calls 800
- Name6 Calls Flop Play
- Flop Ac,Ah,2s
- Name3 Bets 200
- Name5 Folds
- Name6 Folds
- Name3 Returned 200

This example is converted to canonical form as shown in table 1250 of FIG. 12B.

APPENDIX C

Possible Hand Categories Using Hole Cards and Board

The possible hand categories using hole cards and the board include the following:

- Ace high or worse
- Over pair (pocket pair higher than the highest card on the board)
- Under pair (pocket pair lower than the highest card on the board)
- Top pair/top kicker (pairing the highest ranked card on the board, while holding an Ace or King kicker)
- Top pair/medium kicker (pairing the highest ranked card on the board, while holding a Queen, Jack or Ten kicker)
- Top pair/no kicker (pairing the highest ranked card on the board while holding a 9 or worse kicker)
- Middle pair/top kicker (pairing the middle ranked card on the board, while holding a Ace or King kicker)
- Middle pair/medium kicker (pairing the middle ranked card on the board, while holding a Queen, Jack or Ten kicker)
- Middle pair/no kicker (pairing the middle ranked card on the flop while holding a 9 or worse kicker)
- Bottom pair/top kicker (pairing the lowest ranked card on the board, while holding a Ace or King kicker)
- Bottom pair/medium kicker (pairing the lowest card on the board, while holding a Queen, Jack or Ten kicker)
- Bottom pair/no kicker (pairing the lowest card on the board while holding a 9 or worse kicker)
- Top two pair (pairing the top and middle ranked card on the board)
- Bottom two pair (pairing the middle and bottom ranked card on the board)
- Top and Bottom Pair (pairing the top and bottom ranked card on the board)
- Top set (holding a pocket pair matching the highest ranked card on the board)
- Middle set (holding a pocket pair matching the middle ranked card on the board)
- Bottom set (holding a pocket pair matching the lowest ranked card on the board)
- Trips with top kicker (three of a kind using a pair on the board while holding an A or K kicker)
- Trips with medium kicker (matching a pair on the board while holding a Queen, Jack or Ten kicker)
- Trips with no kicker (matching a pair on the board while holding a 9 or worse kicker)
- Nut Straight (Best possible straight using 3 or more cards on the board)
- Second Nut Straight (Second Best possible straight using 3 or more cards on the board)
- Bottom straight (Worse possible straight using 3 or more cards on the board)
- Straight (any other straight)
- Nut flush (Best possible flush using 3 or more cards on the board)
- Second Nut Flush (Second best possible flush using 3 or more cards on the board)
- Flush (any other flush)
- Made Hand (Full house, 4 of a kind, Straight flush, or Royal Flush)

APPENDIX D

Possible Hand Categories with Drawing Potential

Possible hand categories with drawing potential include (1) open ended straight draw (i.e., a draw where any one of 8 cards completes the straight); (2) inside straight draw (i.e., a draw where any one of 4 cards completes the straight; and (3) flush draw (i.e., a draw to a flush).

APPENDIX E

Board Texture

The texture of a board is one or more of the following types:

1 suited: The flop is composed of three cards of the same suit.

2 suited: The flop is composed of three cards from precisely two suits.

Straight Coordinated (straight potential): The flop has three cards with ranks spanning a range of 5 ordinal positions or less (e.g., 79J has a range of 5) and/or the flop has two cards with consecutive rank.

Paired flop: The flop includes precisely two cards of the same rank.

3 of a Kind: The flop includes three cards of the same rank.

A texture of a flop is the union of the aforementioned types that apply to the flop. For example, the flop 7h8hAh, where h refers to the suit Hearts, has a texture of 1 suited with straight potential. As another example, the flop 7h7s6h, where s refers to the suit Spades, has a texture of 2 suited, paired with a straight potential.

What is claimed is:

1. A method of monitoring an online card game provided by a server computing system in a networked computing environment, comprising:

displaying, at a client computing system in communication with said server computing system via a network, a table view associated with a session of said online card game, said table view including a plurality of rows and a plurality of columns, wherein said plurality of rows and said plurality of columns comprises:

a first area comprising a table having a first plurality of cells, each cell identified by a row and a column of said table, wherein a cell of said first plurality of cells is associated with a player of a plurality of players of said card game and is associated with a played hand of a plurality of played hands of said session, wherein said cell of said first plurality of cells displays information selected from the group consisting of:

a starting hand associated with said player, wherein said starting hand was shown by said player during said played hand, a first indicator of said first area indicating that said player raised or re-raised pre-flop during said played hand, a second indicator of said first area indicating that said player saw the flop during said played hand, a third indicator of said first area indicating that said player was associated with the dealer button during said played hand, a fourth indicator of said first area indicating that said player won said played hand, and a fifth indicator of said first area indicating that said player was not dealt cards for said played hand;

a second area comprising a second plurality of cells in a first row of said plurality of rows, wherein a cell of said second plurality of cells is associated with said played hand, wherein said cell of said second plurality of cells displays a first indicator of said second area indicating that said played hand was raised pre-flop or not raised pre-flop;

a third area comprising a third plurality of cells in four rows of said plurality of rows, wherein a first cell of a first row of said four rows displays a size of the pot associated with said played hand, wherein a second cell of a second row of said four rows displays a first number of players who participated in said played hand, wherein a third cell of a third row of said four rows displays a second number of players who saw the flop during said played hand, and wherein a fourth cell of a fourth row of said four rows displays a third number of ending players who participated in the showdown during said played hand;

a fourth area comprising a fourth plurality of cells, wherein a first cell and a second cell of said fourth plurality of cells are in a fourth column and a fifth column, respectively, of said plurality of columns, wherein said first cell of said fourth plurality of cells displays a first indicator of said fourth area that classifies said player as loose or tight, and wherein said second cell of said fourth plurality of cells displays a second indicator of said fourth area that classifies said player as passive or aggressive;

a fifth area comprising a fifth plurality of cells in a third column of said plurality of columns, wherein a cell of said fifth plurality of cells displays an identifier of said player; and a sixth area comprising a sixth plurality of cells in a first column and a second column of said plurality of columns, wherein a first cell of said sixth plurality of cells is included in said first column and a second cell of said sixth plurality of cells is included in said second column, wherein said first cell of said sixth plurality of cells displays a number of hands associated with said player, and wherein said second cell of said sixth plurality of cells displays an indicator of said sixth area indicating an amount of money said player has won or lost during said session.

2. A computer system comprising:

a processor, and a computer-readable memory unit coupled to said processor, said memory unit containing instructions that when executed by said processor implement a method of monitoring an online card game provided by a server computing system in a networked computing environment, said method comprising:

displaying, at a client computing system in communication with said server computing system via a network, a table view associated with a session of said online card game, said table view including a plurality of rows and a plurality of columns, wherein said plurality of rows and said plurality of columns comprises:

a first area comprising a table having a first plurality of cells, each cell identified by a row and a column of said table, wherein a cell of said first plurality of cells is associated with a player of a plurality of players of said card game and is associated with a played hand of a plurality of played hands of said session, wherein said cell of said first plurality of cells displays information selected from the group consisting of:

a starting hand associated with said player, wherein said starting hand was shown by said player during said played hand, a first indicator of said first area indicating that said player raised or re-raised pre-flop during said played hand, a second indicator of said first area indicating that said player saw the flop during said played hand, a third indicator of said first area indicating that said player was associated with the dealer button during said played hand, a fourth indicator of said first area indicating that said player won said played hand, and a fifth indicator of said first area indicating that said player was not dealt cards for said played hand;

a second area comprising a second plurality of cells in a first row of said plurality of rows, wherein a cell of said second plurality of cells is associated with said played hand, wherein said cell of said second plurality of cells displays a first indicator of said second area indicating that said played hand was raised pre-flop or not raised pre-flop;

a third area comprising a third plurality of cells in four rows of said plurality of rows, wherein a first cell of a first row of said four rows displays a size of the pot associated with said played hand, wherein a second cell of a second row of said four rows displays a first number of players who participated in said played hand, wherein a third cell of a third row of said four rows displays a second number of players who saw the flop during said played hand, and wherein a fourth cell of a fourth row of said four rows displays a third number of ending players who participated in the showdown during said played hand;

a fourth area comprising a fourth plurality of cells, wherein a first cell and a second cell of said fourth plurality of cells are in a fourth column and a fifth column, respectively, of said plurality of columns, wherein said first cell of said fourth plurality of cells displays a first indicator of said fourth area that classifies said player as loose or tight, and wherein said second cell of said fourth plurality of cells displays a second indicator of said fourth area that classifies said player as passive or aggressive;

a fifth area comprising a fifth plurality of cells in a third column of said plurality of columns, wherein a cell of said fifth plurality of cells displays an identifier of said player; and a sixth area comprising a sixth plurality of cells in a first column and a second column of said plurality of columns, wherein a first cell of said sixth plurality of cells is included in said first column and a second cell of said sixth plurality of cells is included in said second column, wherein said first cell of said sixth plurality of cells displays a number of hands associated with said player, and wherein said second cell of said sixth plurality of cells displays an indicator of said sixth area indicating an amount of money said player has won or lost during said session.

3. A computer program product, comprising a computer readable storage medium having a computer readable program code stored therein, said computer readable program code containing instructions configured to be executed by a processor of a computer system to implement a method of monitoring an online card game provided by a server computing system in a networked computing environment, said method comprising:

displaying, at a client computing system in communication with said server computing system via a network, a table view associated with a session of said online card game, said table view including a plurality of rows and a plurality of columns, wherein said plurality of rows and said plurality of columns comprises:

a first area comprising a table having a first plurality of cells, each cell identified by a row and a column of said table, wherein a cell of said first plurality of cells is associated with a player of a plurality of players of said card game and is associated with a played hand of a plurality of played hands of said session, wherein said cell of said first plurality of cells displays information selected from the group consisting of:

a starting hand associated with said player, wherein said starting hand was shown by said player during said played hand, a first indicator of said first area indicating that said player raised or re-raised pre-flop during said played hand, a second indicator of said first area indicating that said player saw the flop during said played hand, a third indicator of said first area indicating that said player was associated with the dealer button during said played hand, a fourth indicator of said first area indicating that said player won said played hand, and a fifth indicator of said first area indicating that said player was not dealt cards for said played hand;

a second area comprising a second plurality of cells in a first row of said plurality of rows, wherein a cell of said second plurality of cells is associated with said played hand, wherein said cell of said second plurality of cells displays a first indicator of said second area indicating that said played hand was raised pre-flop or not raised pre-flop;

a third area comprising a third plurality of cells in four rows of said plurality of rows, wherein a first cell of a first row of said four rows displays a size of the pot associated with said played hand, wherein a second cell of a second row of said four rows displays a first number of players who participated in said played hand, wherein a third cell of a third row of said four rows displays a second number of players who saw the flop during said played hand, and wherein a fourth cell of a fourth row of said four rows displays a third number of ending players who participated in the showdown during said played hand;

a fourth area comprising a fourth plurality of cells, wherein a first cell and a second cell of said fourth plurality of cells are in a fourth column and a fifth column, respectively, of said plurality of columns, wherein said first cell of said fourth plurality of cells displays a first indicator of said fourth area that classifies said player as loose or tight, and wherein said second cell of said fourth plurality of cells displays a second indicator of said fourth area that classifies said player as passive or aggressive;

a fifth area comprising a fifth plurality of cells in a third column of said plurality of columns, wherein a cell of said fifth plurality of cells displays an identifier of said player; and a sixth area comprising a sixth plurality of cells in a first column and a second column of said plurality of columns, wherein a first cell of said sixth plurality of cells is included in said first column and a second cell of said sixth plurality of cells is included in said second column, wherein said first cell of said sixth plurality of cells displays a number of hands associated with said player, and wherein said second cell of said sixth plurality of cells displays an indicator of said sixth area indicating an amount of money said player has won or lost during said session.

* * * * *